US011333555B2

(12) United States Patent
Harhira et al.

(10) Patent No.: US 11,333,555 B2
(45) Date of Patent: May 17, 2022

(54) LASER-INDUCED BREAKDOWN SPECTROSCOPY FOR DETERMINING A PROPERTY OF AN OIL SANDS ORE SAMPLE

(71) Applicants: SYNCRUDE CANADA LTD. in trust for the owners of the Syncrude Project as such owners exist now and in the future, Calgary (CA); NATIONAL RESEARCH COUNCIL OF CANADA, Ottawa (CA)

(72) Inventors: Aïssa Harhira, Montreal (CA); Richard Paproski, Edmonton (CA); Josette El Haddad, Boucherville (CA); Mohamad Sabsabi, Longueuil (CA); Alain Blouin, Montreal (CA)

(73) Assignee: SYNCRUDE CANADA LTD., Calgary (CA), in trust for the owners of the Syncrude Project as such owners exist now and in the future ( * ) Notice: Subject to any disclaimer, the term of this patent is extended or adjusted under 35 U.S.C. 154(b) by 0 days.

(21) Appl. No.: 16/920,029

(22) Filed: Jul. 2, 2020

(65) Prior Publication Data
US 2022/0003605 A1    Jan. 6, 2022

(51) Int. Cl.
  *G01J 3/443*   (2006.01)
  *G01J 3/02*    (2006.01)
  *G01N 15/02*   (2006.01)
  *G01J 3/42*    (2006.01)

(52) U.S. Cl.
  CPC ............ *G01J 3/443* (2013.01); *G01J 3/021* (2013.01); *G01J 3/0208* (2013.01); *G01N 15/0205* (2013.01); *G01J 2003/423* (2013.01)

(58) Field of Classification Search
  CPC .......... G01J 3/443; G01J 3/0208; G01J 3/021; G01J 2003/423; G01N 15/0205
  See application file for complete search history.

(56) References Cited

U.S. PATENT DOCUMENTS

| 9,335,637 B2 * | 5/2016 | Delgado ............. G03F 7/70033 |
| 9,719,933 B1 * | 8/2017 | Paproski ............. G01N 21/274 |
| 2019/0346370 A1 | 11/2019 | Harhira et al. |

FOREIGN PATENT DOCUMENTS

| CA | 2949425 | 1/2017 |
| WO | 2018/098558 A1 | 6/2018 |

OTHER PUBLICATIONS

Harhira et al. "Rapid Determination of Bitumen Content in Athabasca Oil Sands by Laser-Induced Breakdown Spectroscopy", Energy & Fuels 2018, 32 (3), 3189-3193.

(Continued)

Primary Examiner — Jamil Ahmed
(74) Attorney, Agent, or Firm — Bennett Jones LLP

(57) ABSTRACT

A method of quantifying at least one property of interest of an oil sands ore sample is provided using a laser-induced breakdown spectroscopy (LIBS) method. The property of interest may include bitumen content, water content, particle size information, cation exchange capacity, methylene blue index, mineralogical content (e.g., quartz, total clay, and clay components), amorphous material content, total ash content, and connate water parameter (e.g., conductivity, chloride content, or alkalinity).

22 Claims, 25 Drawing Sheets

(56) References Cited

OTHER PUBLICATIONS

Enbo Feng, Elom Domlan, Ramesh Kadali, Spectroscopic Measurements in Oils Sands Industry—From Laboratories to Real-Time Applications, ScienceDirect, IFAC—PapersOnLine, 2015, 48-8; 199-204.

Aissa Harhira, Jossette El Haddad, Alain Blouin, Mohamad Sabsabi, Rapid Determination of Bitumen Content in Athabasca Oil Sands by Laser-Induced Breakdown Spectroscopy, Energy&Fuels, 2018, 32, 3189-3193.

* cited by examiner

LASER-INDUCED BREAKDOWN SPECTROSCOPY FOR DETERMINING A PROPERTY OF AN OIL SANDS ORE SAMPLE

FIELD OF THE INVENTION

The invention relates to systems and methods of determining a property of an oil sands ore sample using laser-induced breakdown spectroscopy (LIBS).

BACKGROUND OF THE INVENTION

Properties of an oil sands ore may be analyzed to predict its processability in a bitumen extraction process, such as the Clark Hot Water Extraction Process. Mineral concentrations and particle size distribution (PSD) information are of interest. Quartz content is indicative of sand content. Fine particles (<44 microns in diameter) and clay minerals interfere with bitumen aeration in primary separation processes by flotation, and tailings dewatering. Potassium-40 (K40) radioactive spectrometry provides an indirect indicator of fine particles and clay content, but does not detect fine particles or clays that may not contain significant concentrations of potassium in their structure (e.g., chlorite, kaolinite, and smectite). Further, K40 signals may provide a false positive for fine particles and clays when potassium feldspar is present. Cation exchange capacity (CEC) is an indirect indicator of the presence of clays, especially swelling smectite clays, and may be determined by copper triethylenetetramine (Cu-trien) complex exchange. Total ash content, as determined by loss-on-ignition (LOI) methods, is an indirect indicator for the presence of carbonaceous solids (e.g., coal). Carbonaceous solids are potentially problematic for froth treatment processes where solids and water that were recovered with the bitumen are removed to minimize the downstream risk of erosion and corrosion. Measuring how coarse the sand is (e.g., D50, D90, %>180 micron) can be important for understanding the risk of sanding within oil sand slurry, tailings, and bitumen froth pipelines.

The aforementioned physicochemical methods for analyzing these properties may be time consuming, labor and equipment intensive, and suboptimal in accuracy and reliability.

U.S. Pat. No. 9,719,933 (Paproski et al.; 2017 Aug. 1) discloses use of laser-induced breakdown spectroscopy (LIBS) to characterize certain properties of an oil sands ore. LIBS uses a high energy pulsed laser to excite a sample of the matter, and thereby convert a small portion (e.g., micrograms) at the sample surface into a high temperature plasma. Excited atoms of the plasma emit light at wavelengths that are characteristic of different elements or molecular fragments. A spectrometer/detector analyzes the radiation to provide the intensity of emitted light at different wavelengths. The resulting spectrum indicates the composition of matter.

In U.S. Pat. No. 9,719,933 (Paproski et al.; 2017 Aug. 1) the properties determined by LIBS-based analysis are primary bitumen recovery, combined primary and secondary bitumen recovery, primary froth bitumen content, primary froth water content, combined primary and secondary froth water content, primary froth solids content, combined primary and secondary froth solids content, optimal process aid (caustic) dosage, solids particle size information, and solids methylene blue index. It is important to note that a method for determining how coarse the sand is (e.g., D50, D90, %<180 micron), is not disclosed by U.S. Pat. No. 9,719,933.

As quartz sand particles at 44 micron and 2000 micron are both predominantly made of silicon and oxygen, it is not obvious how to use a technique that measures elemental signals, such as LIBS, to measure the coarseness of the sand above 44 microns.

Harhira et al. in "Rapid Determination of Bitumen Content in Athabasca Oil Sands by Laser-Induced Breakdown Spectroscopy", Energy & Fuels 2018, 32 (3), 3189-3193, discloses use of LIBS to characterize bitumen content of oil sands ore.

U.S. Patent Application Publication no. 20190346370 A1 (Harhira et al.; 2019 Nov. 14) discloses use of a two laser LIBS system, where a first pulsed laser is used to produce a crater to reveal freshly exposed sample surface, which is then targeted by a laser shot from a second laser to produce a LIBS emission spectrum used to characterize bitumen, water, solids, quartz, total clay, illite, and kaolinite content of an oil sands ore sample. While useful, this two laser system requires twice as many expensive lasers and additional complexity. If the first shot is only used for preparing the surface, preferential ablation/removal of certain sample components during the first pulse must be considered, as this can affect what is available for measurement with the second laser shot. For measuring ore with highly variable sample height on a fast moving conveyor, there is added complexity of focusing two lasers on the same moving point and hitting that same point with shots from the first and second lasers at different times, over a variable working distance.

Notwithstanding, there remains a need in the art for adaptation of LIBS to determine other properties of an oil sands ore sample. Such adaptation is a non-trivial problem in view of numerous parameters affecting LIBS analysis.

SUMMARY OF THE INVENTION

In one aspect, the present invention comprises a method of determining at least one property of interest of a test oil sands ore sample that is not an aqueous oil sands slurry. The method comprising the steps of: (a) applying a plurality of pulsed laser shots focused on a surface of the test oil sands ore sample to ablate the test oil sands ore sample and create a plurality of short-lived plasmas; (b) acquiring the emission spectra from at least some or all of the plasmas; (c) repeating steps (a) and (b) on one or more ablation sites; (d) averaging the acquired emission spectra together for the test oil sands ore sample to form a test emission spectrum; and (e) determining the at least one property of interest comprising one or more of the following properties: (i) a cation exchange capacity; (ii) an ash content; (iii) an amorphous material content; (iv) at least one connate water property; or (v) a solids particle size distribution property comprising one or more of a solids percentile particle size, or a percentage of solid particles having a particle size less than or greater than 180 μm. Step (e) is performed by applying, to the test emission spectrum, at least one calibration loading obtained from a chemometric model relating an emission spectrum, or a portion of an emission spectrum, obtained from a known oil sands ore sample to a reference value obtained from a physicochemical analysis method for determining the at least one property of interest of the known oil sands ore sample.

In one embodiment of the method, the at least one property of interest comprises the cation exchange capacity.

In one embodiment of the method, the at least one property of interest comprises the ash content.

In one embodiment of the method, the at least one property of interest comprises the amorphous material content.

In one embodiment of the method, the at least one property of interest comprises the at least one connate water property. The at least one connate water property may comprise a connate water conductivity, a connate water chloride content, or a connate water alkalinity.

In one embodiment of the method, the at least one property of interest comprises the solids particle size distribution property comprising the solids percentile particle size.

In one embodiment of the method, the at least one property of interest comprises the percentage of solid particles have a particle size less than or greater than 180 μm.

In one embodiment of the method, step (a) is repeated while the test oil sands ore sample is either not moving in relation to the pulsed laser shots, or moving in relation to the pulsed laser shots solely for allowing successive pulsed laser shots to be incident on different portions of the test oil sands ore sample. In such an embodiment, the test oil sands ore sample may be moving in relation to the pulsed laser shots at a speed equal to or less than 50 mm/s.

In one embodiment of the method, step (a) is repeated while the test oil sands ore sample is moving in relation to the pulsed laser shots for conveying the test oil sands ore sample between stages of a bitumen extraction process. In such an embodiment, the test oil sands ore sample may be moving in relation to the pulsed laser shots at a speed equal to or greater than 50 mm/s.

In one embodiment of the method, step (a) is repeated while the test oil sands ore sample is moved in a forward longitudinal direction in relation to the pulsed laser shots, such that the plurality of ablation sites collectively form a continuous ablated groove along the surface of the test oil sands ore sample.

In such embodiment where the sample is moved in a forward longitudinal direction in relation to the pulsed laser shots, successive ones of the ablation sites may overlap with each other.

In such embodiment where the sample is moved in a forward longitudinal direction in relation to the pulsed laser shots, step (a) is repeated while scanning the pulsed laser shots back and forth, in the forward longitudinal direction and a rearward longitudinal direction opposite thereto, over a scan line distance, such that successive ones of the ablation sites gradually deepen a portion of the ablated groove over the scan line distance. The scan line distance may be less than about 1 cm in length in the longitudinal direction.

In such embodiment where the sample is moved in a forward longitudinal direction in relation to the pulsed laser shots, step (a) is repeated with the pulsed laser shots oriented relative to the normal to the surface of the test oil sands ore sample at an angle, α, of at least 5° and less than or equal to 45°, and fired in the longitudinal direction opposite to the longitudinal direction of movement of the test oil sands ore sample in relation to the pulsed laser shots.

In another aspect, the present invention comprises the use of a laser induced breakdown plasma spectroscopic system comprising a laser ablator and a spectrometer combined with one or more processors and a memory, wherein the memory stores comprises a non-transient computer readable medium storing instructions executable by the one or more processors to implement any one or combination of the embodiments of the above method.

BRIEF DESCRIPTION OF THE DRAWINGS

In the drawings, which form part of the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIG. 3A (perspective view) and FIG. 3C (cross-sectional side view) show the option of the laser spot quickly sweeping back and forth over a short scan distance parallel to the direction of motion of the oil sand sample.

DETAILED DESCRIPTION OF EMBODIMENTS OF THE INVENTION

Definitions

Figure 1:
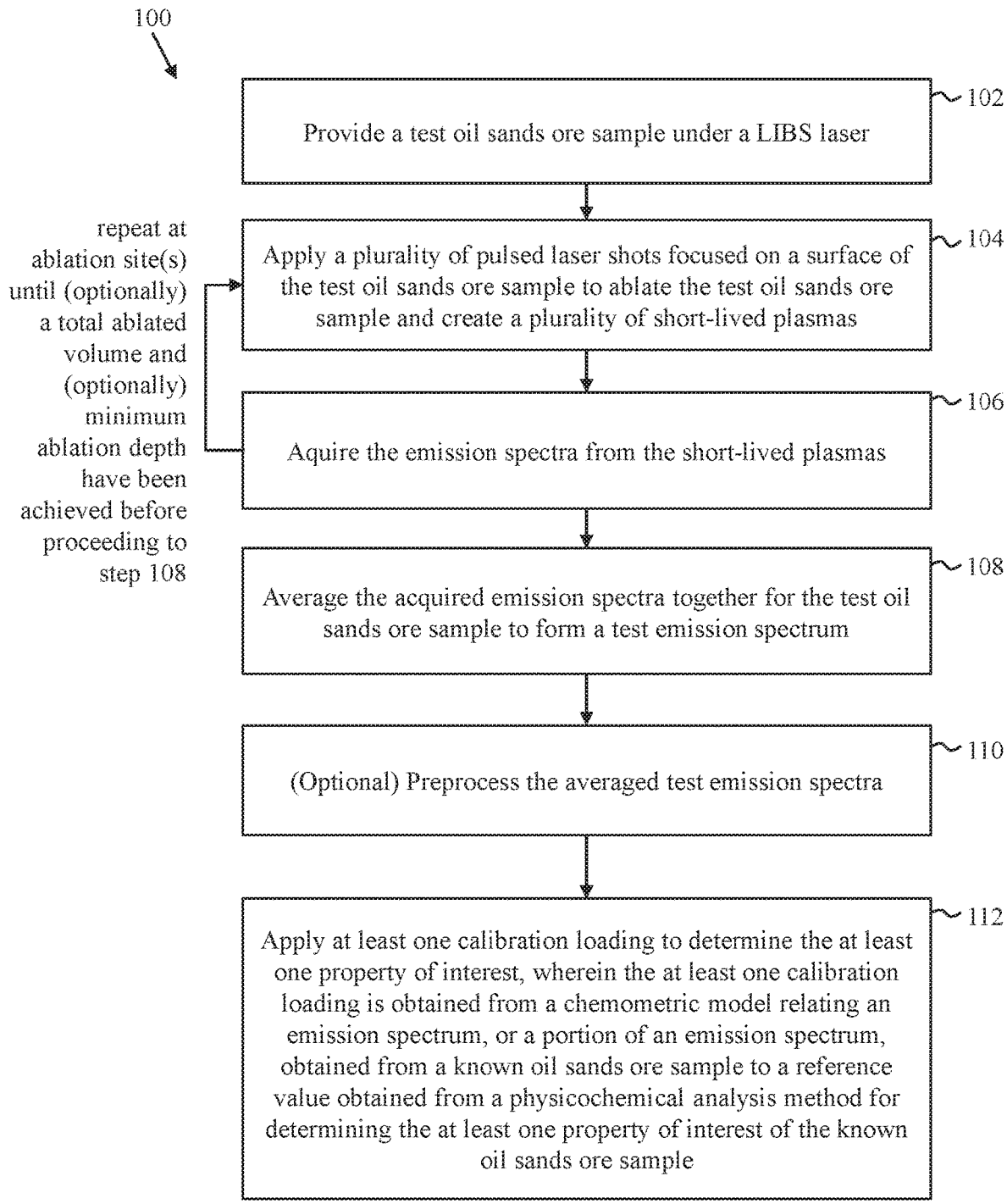
FIG. 1 is a flow chart of an embodiment of a method of the present invention for determining a property of interest of an oil sands ore sample.

The invention relates to characterization of an oil sands ore sample using laser-induced breakdown spectroscopy (LIBS). Any term or expression not expressly defined herein shall have its commonly accepted definition understood by a person skilled in the art. Such ordinary meanings may be obtained by reference to technical dictionaries, such as Hawley's Condensed Chemical Dictionary 14.sup.th Edition, by R. J. Lewis, John Wiley & Sons, New York, N.Y., 2001. As used herein, the following terms have the following meanings.

"Alkalinity" refers to the acid-neutralizing capacity of the connate water of an oil sands ore sample. The acid-neutralizing capacity may be attributable to the presence of water soluble bicarbonate and carbonate, but may also be attributable to the presence of other buffering components. Alkalinity may be expressed in units of calcium carbonate equivalents (e.g., mg/L $CaCO_3$ eq.). Physicochemical analysis methods for determining alkalinity include, without limitation, connate water extraction and titration.

"Amorphous material content" refers to weight content of an oil sands ore sample that consists of solid components that possess insufficient long-range atomic order to produce sharp X-ray diffraction peaks. Coal and other carbonaceous solids are examples of amorphous material. Physicochemical analysis methods for determining amorphous material content include, without limitation, X-ray diffraction.

"Ash content" or "total ash content" refers to the weight content of the solids of an oil sands ore sample that remain as a non-combustible inorganic ash residue after the solids are subjected to complete combustion. Prior to ashing the solids, the bitumen and water are removed from the oil sands ore sample, typically by Dean & Stark Soxhlet extraction using toluene. Ash content may be expressed as a weight percentage of the non-combustible inorganic ash residue to the weight of the solids before ashing. Physicochemical analysis methods for determining ash content include, without limitation, a loss-on-ignition (LOI) test, as may be performed in accordance with known standards such as ASTM D3174—Standard Test Method for Ash in the Analysis Sample of Coal and Coke from Coal, ASTM D7348—Standard Test Method for Loss on Ignition (LOI) of Solid Combustion Residues, and similar methods.

"Cation exchange capacity" or "CEC" refers to a measure of the amount of positive charge that can be exchanged per mass of a sample, under specified conditions (e.g., dispersion, ionic strength, pH, exchange time). CEC may be expressed in units of positive charge (or equivalents) per unit mass of sample, such as cmol/kg or meq/100 g. Physicochemical analysis methods for determining CEC include, without limitation, exchange of triethylenetetramine (Cu-trien) complex, or other exchangeable cations that can be measured by various means.

"Calibration loading" refers to a set of one or more numerical values relating a value or a range of values of a property of interest to one or more different wavelengths of an LIBS-based emission spectrum or portion thereof, in a chemometric model.

"Chemometric model" refers to a mathematical, statistics-based model that correlates data relating a value or range of values of a property of interest of a sample to one or more different wavelengths of an LIBS-based emission spectrum or portion thereof.

"Dean-Stark extraction" refers to a physicochemical analysis method for determining bitumen, water, and/or solids content of an oil sands ore sample. In one embodiment, the method involves separating a weighed sample into bitumen, water, and solids by refluxing toluene in a Soxhlet extraction apparatus; condensed toluene and co-distilled water are continuously separated in a trap designed to recycle the solvent through the extraction thimble, dissolving the bitumen present in the sample, while the water is retained in the trap.

"Known sample", "sample with known composition", and "well-characterized sample", and like terms refer to a sample having a property that has been analyzed and quantified by one or more physicochemical analysis methods.

"Laser-induced breakdown spectroscopy" or "LIBS" refers to a type of atomic emission spectroscopy that uses a laser as the excitation source. In general, LIBS involves focusing a pulsed laser onto an area on the surface of a target sample. When the pulsed laser is discharged, it ablates a small amount of material and creates an ablation site or crater and a plasma plume. The ablated material dissociates (i.e., breaks down) into excited ionic, atomic, and molecular fragment species. During this time, the plasma emits a spectrum of radiation, and the plasma expands and cools. "LIBS-based emission spectrum" refers to the emission spectrum produced by this plasma. The characteristic emission lines of the elements and molecular fragments in the plasma can be observed at certain wavelengths and at certain times following the initial ablation and plasma formation to characterize chemical composition and properties of the ablated sample material.

"Memory" refers to a non-transitory tangible medium for storing information in a format readable by a processor, and/or instructions readable by a processor to implement an algorithm. Such instructions may be encoded based on programming languages known in the art, with non-limiting examples including C/C++, Python, etc. Non-limiting types of memory include solid-state, optical, and magnetic computer readable media. The term "memory" includes a plurality of physically discrete, operatively connected devices despite use of the term in the singular.

"Methylene blue index" or "MBI" refers to an indicator of clay activity based on a sample's absorption of methylene blue (a cationic dye). Physicochemical analysis methods for determining MBI include, without limitation, methylene blue index titration.

"Mineralogical content" refers to the weight content of a sample comprising one or a combination of specified minerals. The specified mineral may be, without limitation, quartz, chlorite, illite, kaolinite, smectite (including montmorillonite), interstratified clays, muscovite, pyrite, siderite, dolomite, calcite, plagioclase feldspar, potassium feldspar, rutile, anatase, or zircon. Mineralogical content may be expressed as a percentage of the weight of the specified mineral to the total weight of the sample. Physicochemical analysis methods for determining mineralogical content include, without limitation, X-ray diffraction.

"Moving sample" refers to an oil sands ore sample that is moving in relation to the laser of a LIBS system when the laser is fired at the sample, wherein the movement is for conveying the sample from one stage to another stage of a bitumen extraction process. As non-limiting examples, the moving sample may be conveyed from a mine face to an ore crushing step, from an ore crushing step to an ore sizing step, or from an ore sizing step to a slurry production step, of a bitumen extraction process. In non-limiting embodiments, a moving sample may be moved at speed equal or greater than 50 mm/s, 100 mm/s, 500 mm/s, or 1000 mm. A "stationary sample" refers to an oil sands ore sample that is not a "moving sample." A stationary sample includes a sample that is not moving in relation to the laser of a LIBS system when the laser is fired at the sample. A stationary sample also includes a sample that is moving in relation to the laser of a LIBS system when the laser is fired at the sample, wherein the movement is solely for allowing successive laser shots of the laser to be incident on different portions of the sample. In non-limiting embodiments, a stationary sample may be moving at a speed less than or equal to 50 mm/s, 10 mm/s, 4 mm/s, or 1 mm/s, in relation to the laser of a LIBS system when the laser is fired at the sample.

"Oil sands ore sample" refers to a sample obtained from an oil sand deposit, including, without limitation, drill cores, cuttings, mine-face samples, crushed and/or screened ore, but does not include an aqueous oil sands slurry. Oil sands ore comprises bitumen-rich sand, clays and water, but also includes mixtures of this material with material from the other distinct layers within an oil sand mine: muskeg, overburden, and rock.

"Physicochemical analysis method" refers to any method accepted by one skilled in the art as being reasonably accurate to determine a physical property of a sample. Physicochemical analysis method does not include laser-induced breakdown spectroscopy (LIBS). For example, in respect to the property of particle size distribution, non-limiting examples of physicochemical analysis methods include wet sieving and Coulter laser diffraction.

"Plasma" refers to a plume of material that includes excited ions, atoms, molecular fragments, and electrons which is produced when a laser pulse of sufficient energy irradiates an oil sands ore sample. The excited ionic, atomic, and molecular fragment species from the sample may be representative of the composition and properties of the sample.

"Processor" refers to one or more electronic devices that is/are capable of reading and executing instructions stored on a memory to perform operations on data, which may be stored on a memory or provided in a data signal. Non-limiting examples of processors include devices referred to as microprocessors, microcontrollers, central processing units (CPU), and digital signal processors. The term "processor" includes a plurality of physically discrete, operatively connected devices despite use of the term in the singular.

"Solids percentile size" refers to the particle size corresponding to a specified percentile in an ascending, cumulative, particle size distribution (based on either volume or mass) of solids in an oil sands ore sample. In this context, size may be determined either on an equivalent diameter basis, or a maximum dimension basis. Particle size distribution percentile size may be expressed in the form "D[n]", where "n" is the specified percentile. For example, if the "D10", "D50", and "D90" values of an oil sands ore sample are "x", "y", and "z" microns, then 10%, 50%, and 90% of either the volume or mass of particles in the oil sands ore sample are smaller than "x", "y", and "z" microns, respectively. Physicochemical analysis methods for determining solids percentile size include, without limitation, Coulter laser diffraction.

"Total clay content" is a type of mineralogical content referring to the weight content of an oil sands ore sample comprising chlorite, illite, kaolinite, smectite (including montmorillonite), and interstratified clays, in combination, if present in the sample. Physicochemical analysis methods for determining total clay content include, without limitation, X-ray diffraction.

Method and System.

Figure 2A:
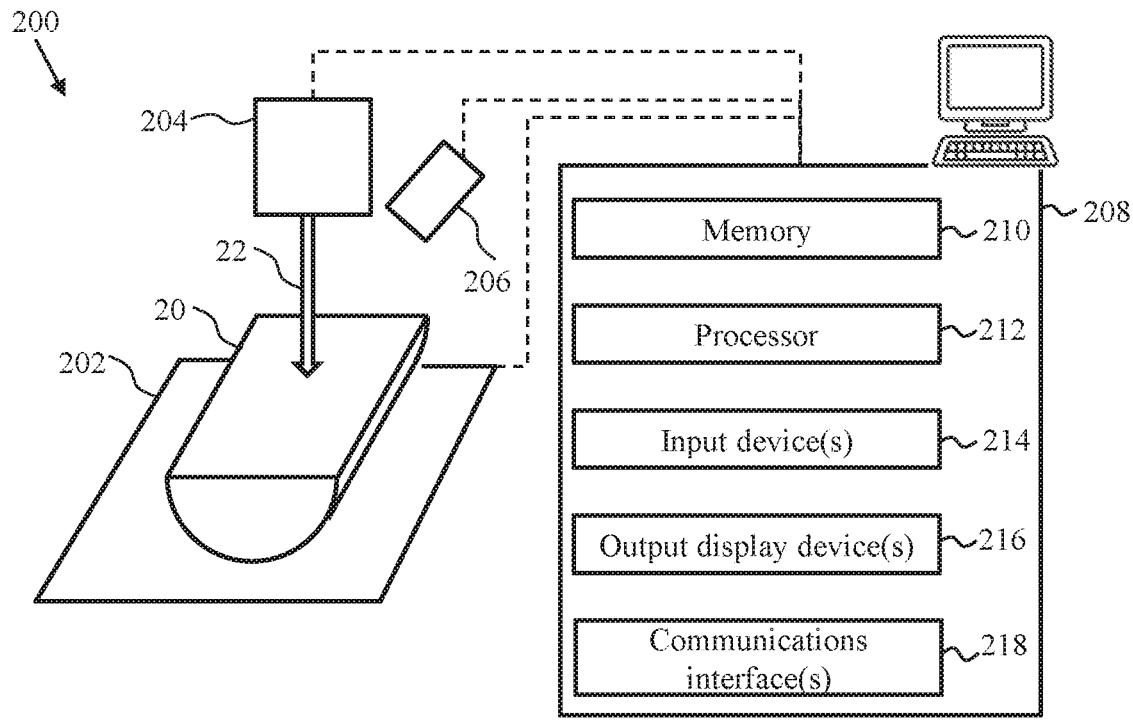
FIGS. 2A and 2B are schematic depictions of a LIBS system of the present invention for determining a property of interest of an oil sands ore sample, when the system emits a laser shot on the sample (FIG. 2A), and when the system detects light waves emitted by a plasma plume produced from the oil sands ore sample (FIG. 2B).
Figure 2B:
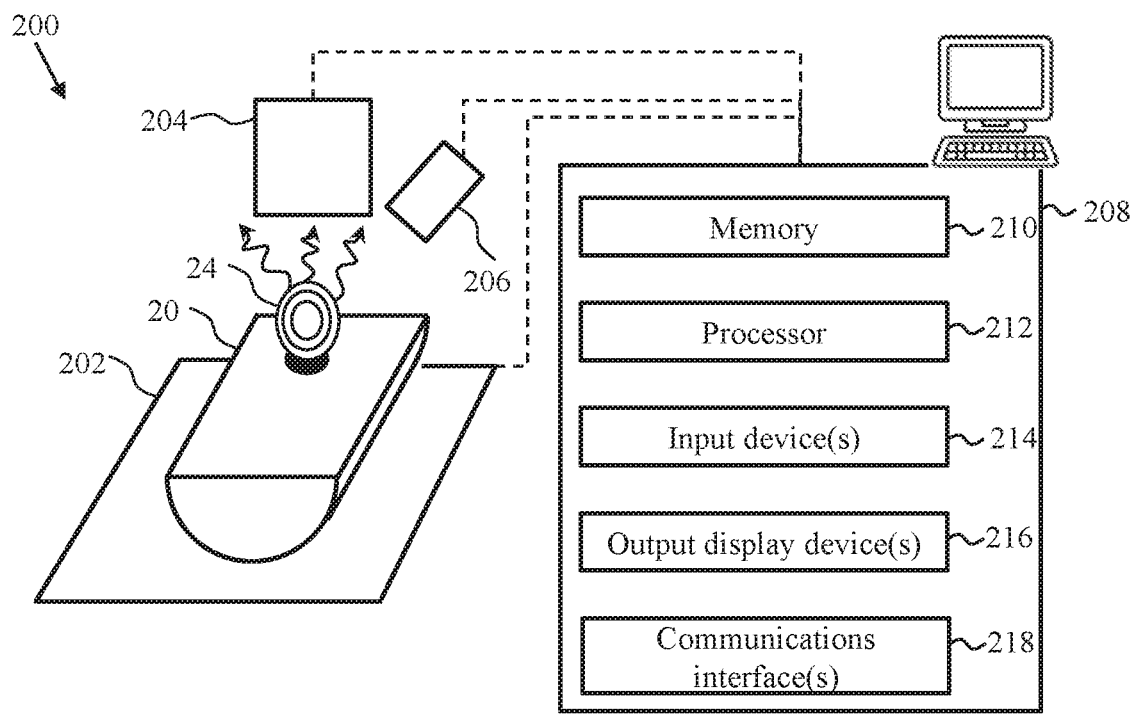

FIG. 1 shows a flow chart of an embodiment of a method 100 for determining at least one property of interest of a test oil sands ore sample 20, as may be implemented using LIBS system 200 shown in FIGS. 2A and 2B.

In the embodiment shown in FIGS. 2A and 2B, LIBS system 200 includes a motorized stage 202, laser 204, spectrometer 206, and instrument controller 208. Stage 202, laser 204, and spectrometer 206 are described below. Instrument controller 208 is operatively connected (as shown by dashed lines) to these components. In the embodiment shown in FIGS. 2A and 2B, instrument controller 208 includes operatively connected memory 210, processor 212, input device(s) 214, output display device(s) 216, and communications interface(s) 218. Memory 210 comprises a non-transient computer readable medium storing instructions that are executable by processor 212, which memory 210 may be considered as a computer program product of the present invention. Processor 212 may execute the stored instructions to control movement of motorized stage 202 (e.g., in step 104 below), to control power, pulse repetition rate, and other parameters of laser 204 (e.g., in step 104 below), and to analyze electronic signals generated by spectrometer 206 to determine a property of interest of sample 20 (e.g., in steps 108 to 112 below). Input device 214 (e.g., computer mice, keyboard, touch screen, and the like) may be used by a human operator to configure parameters for controlling the method. Output display device 216 (e.g., a computer display monitor) may show, in human readable form, data related to or generated by the method (e.g., operational parameters, test emission spectra, results of the determined property of sample 20). Communications interface 218 includes software and hardware components (e.g., data port, modems, and the like) allowing processor 212 to transmit such data to other electronic devices, such as computer devices used in a bitumen extraction process.

Method 100 and system 200 are described below in greater detail. Reference is made throughout to an illustrative "Experimental Example", which provides non-limiting embodiments of the present invention.

Step 102.

Step 102 involves providing a test oil sands ore sample to laser 204.

Sample 20 may be obtained by conventional coring technologies or can be surface mined if the oil sands ore layer is close enough to the surface to be mined (normally less than about 120 meters below the surface). In the embodiment shown in FIG. 1, sample 20 has a semicylindrical shape produced by a longitudinal section of a core sample.

In embodiments, sample 20 can be accessed, processed, and/or presented under laser 204 in a variety of environments. Examples include a laboratory, in situ via a hole drilled from the surface, an exposed surface mine face, or on a conveyor upstream of a slurry production process.

Stage 202 is used to support sample 20 under laser 204. In embodiments, stage 202 may be stationary. In other embodiments, stage 202 may be moving. For example, stage 202 may be disposed on or form part of a conveyor belt.

In the Experimental Example, test oil sands ore sample 20 were tested both as stationary samples and as simulated moving samples to simulate movement on a moving conveyor belt. For stationary samples, a circular shaped sample 20 was supported on a stage translatable in perpendicular horizontal directions under control of a computer. For simulated moving samples, 1 kg of crushed oil sands ore sample was deposited in an annular shaped pan. The pan was rotated by a motorized turntable to move sample 20 at about 250 mm/s relative to the laser, while a translation stage simultaneously translated in the pan in the radial direction so to avoid successive laser shots onto the same position of the sample surface and thereby better simulate the measurement of ore on a conveyor.

Step 104.

Step 104 involves applying a plurality of pulsed laser shots 22 focused on a surface of test oil sands ore sample 20 to ablate the test oil sands ore sample 20 and create a plurality of short-lived plasmas 24. Step 104 is performed using laser 204, which may be under control of processor 212.

As shown in FIG. 2A, laser 204 emits a laser shot 22 to excite a portion of sample 20 at its surface, and thereby ablate and convert such portion into a plasma 24. As shown in FIG. 2B, the excited ions, atoms, molecular fragments, and electrons of plasma 24 emit light radiation.

In embodiments, laser 204 may include an optical system (e.g., a lens and focusing mechanism) to direct laser shot 22 to the surface of sample 20. In certain embodiments, laser 204 has a focal spot diameter ranging from 40 microns to 2000 microns, or rectangular spot from 10 microns to a few centimeters using cylindrical lenses. The focal spot diameter is the diameter of the laser beam at its focal spot, enclosing at least 60% of the maximum laser intensity, and is where the laser beam has the highest concentrated energy. In one embodiment, laser shot 22 is focused near or just below the surface of sample 20 to deliver at least minimum thresholds of energy per unit time and per unit area, which is required for efficient ablation of sample 20 and formation of plasma 24.

In embodiments, laser 204 is configured (e.g., with a power supply with an operatively connected timing circuit) to emit laser shots 22 with a short pulse width at a high repetition rate, such that a plurality of pulsed laser shots 22 may be emitted within a given amount of time. Powerful and fast repetition rate pulsed lasers may be useful in achieving the optional minimum ablation volume for sample 20 in a suitably short amount of time (e.g., several minutes). As an example, the repetition rate may range from 1 Hz up to 50 kHz.

Laser 204 may be configured to have a pulse that is nanoseconds in duration (hereinafter, a "nanosecond laser"). A nanosecond laser may be a Q-switched Nd:YAG laser. A benefit of nanosecond lasers, operating at the fundamental wavelength, is that the end of the pulse is partially absorbed by the plasma itself, which can increase the plasma temperature. This helps to produce stronger LIBS signals for elements that require high excitation energies (e.g., C, H, N, and O). It has been found that pulse durations on the order of 5-10 ns are suitable for characterizing oil sands ore.

As another example, laser 204 may be configured to have a pulse that is femtoseconds in duration (hereinafter, a "femtosecond laser"). A femtosecond laser may or may not be a femtosecond fiber laser. Femtosecond lasers may offer closer to stoichiometric sampling, reduced wide spectrum continuum emission, and shorter-lived plasmas that permit use of laser pulses with higher repetition rates.

In embodiments, laser 204 may be configured to contact sample 20 with a laser beam 22 at a desired illumination angle with respect to the surface of sample 20. For example, the illumination angle between the laser beam and surface of sample 20 may range from 0 degree to nearly 90 degrees, such as 30 degrees, or 45 degrees, or 60 degrees, provided that an adequate fluence and other criteria are achieved. It has been found that the LIBS-based emission spectrum is not significantly affected when the incident laser beam is tilted from the perpendicular to the sample surface by less than 45 degrees.

In embodiments, a purge gas such as argon or other gas, or compressed air may be applied to remove ejected particles, and other particles generated by the ablation that would interfere with incidence of laser 22 on surface of sample 20, and subsequent detection of emission spectra from plasma 24. Use of an inert gas may provide for higher spectrum intensity. However, acceptable results may still be achieved using compressed air as a purge gas, or no purge gas at all, with use of a suitably designed optical path and sufficient working distance between laser 204 and sample 20 that manages issues such as particles ejected during ablation.

It has been found that a laser with a minimum energy of 20 mJ, a fluence greater than 25 J/cm$^2$, and a laser spot diameter greater than 300 μm is suitable for characterization of an oil sands ore sample. This allows for an acceptable ablation rate, and ensures having sufficient fluence exceeding the threshold of generating plasma with a reasonable cooling decay over time, and an acceptable depth of focus to overcome surface roughness and variability effects. When using a 5-10 ns 1064 nm laser at a given spot size, a fluence range of about 25 to 50 J/cm$^2$ is useful to maximize the ablation rate, optimize plasma generation for exciting the elements and molecular components in oil sand ore samples and improve signal to noise ratio. Lower fluence should be avoided. Larger spot diameters are generally preferred provided that a fluence between 25 and 50 J/cm$^2$ can still be achieved. Small spot diameters may lead generally to a poorer sampling, require complex optics, and a shorter working distance between optical components and the sample surface (which makes it difficult to manage ejected particles). Small spot diameters may also have smaller depths of focus (which make it difficult to keep the spot focused on a rough sample surface), and may suffer from plasma confinement effects when overlapping laser shots are used to produce an ablation groove up to 5 mm deep in a sample.

It is common to direct the LIBS laser onto the sample surface at a perpendicular angle (i.e., normal to the surface), forming a predominantly circular laser spot on the sample surface. When the laser beam irradiates a predominantly flat sample surface, such as an oil sand core sample, at a different angle, the focal spot has a shape closer to an ellipse than a circle, which has a higher area and produces a lower fluence. For analysis of stationary samples, one embodiment of the method involves slowly moving the laser spot across the sample surface lengthwise across the core (FIGS. 3A to 3C), by the motion 26 of the sample 20 in a forward longitudinal direction relative to the laser 204, parallel to the length of the sample 20. This allows the entire core length to be continuously analyzed without potentially missing very thin features (e.g., clay lenses) that could be missed by only analyzing discrete points along the core. It also allows overlapping laser shots to achieve the desired depth of ablation of about 0.4 to 5 mm. A potential drawback of this approach is that the leading edge of the laser spot is at the original height of the sample while the trailing edge of the spot is at the bottom of the groove 30 formed by ablation of the sample surface (FIG. 3B). This creates an ellipse-like shape across the sloped sample surface at the leading edge of the groove and a lower fluence over this larger laser spot area 32. For a 400 micron spot, and a 1 mm deep groove 30, the laser is hitting this sloped surface at the leading edge of the groove 30 at about a 65-70° angle from normal of the sloped surface, producing an ellipse-like shaped laser spot area 32 with about 2.5-fold higher area and therefore about 2.5-fold lower fluence compared to the circular laser spot before the groove was created. Another drawback for LIBS systems where a portion of the laser optics and spectrometer light collection optics are shared (i.e. collinear), is that the plasma 24 forms above the groove's leading edge at predominantly right angles to this surface (FIG. 3B), which can result in a plasma that is not well aligned with the light collection optics, leading to decreased sensitivity.

Figure 3A:
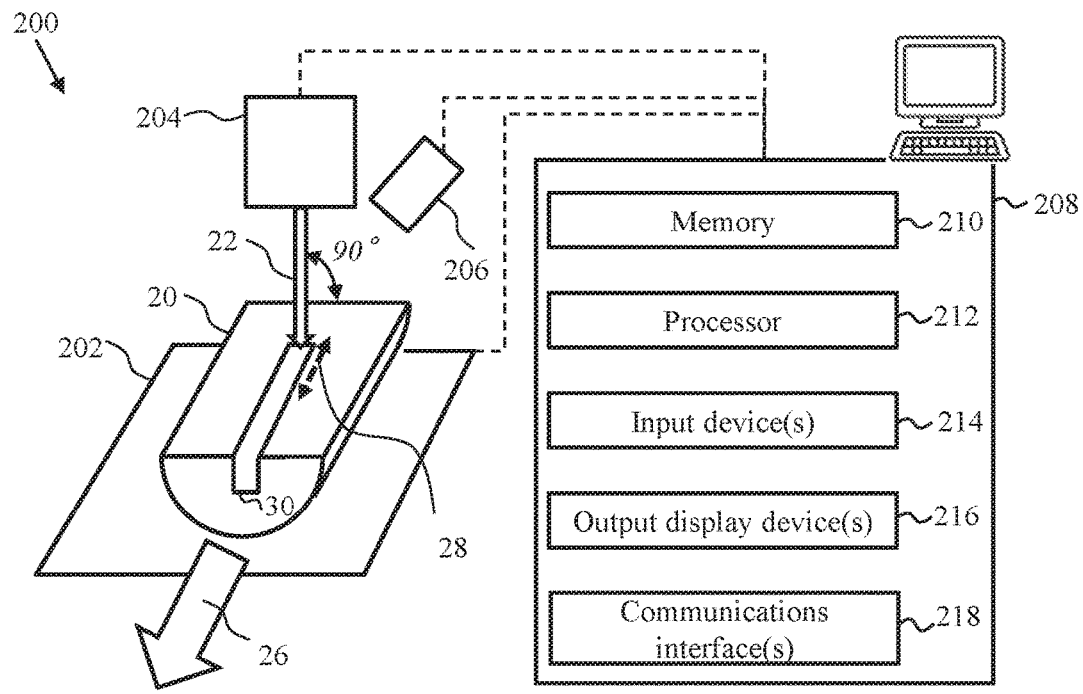
FIG. 3A (perspective view), and FIG. 3B (cross-sectional side view) are schematic depictions of embodiments of the present invention where the laser is directed at or near 90° to the sample surface and overlapping laser shots produce an ablation groove as the sample is moved in relation to the laser spot.
Figure 3B:
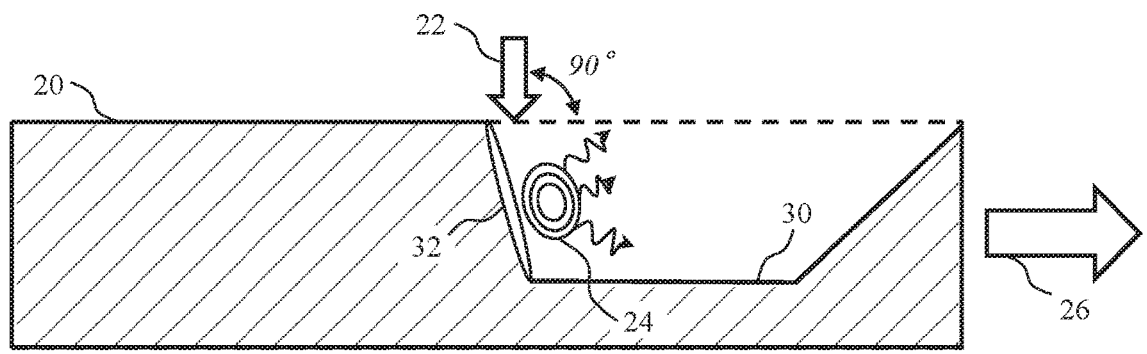
Figure 3C:
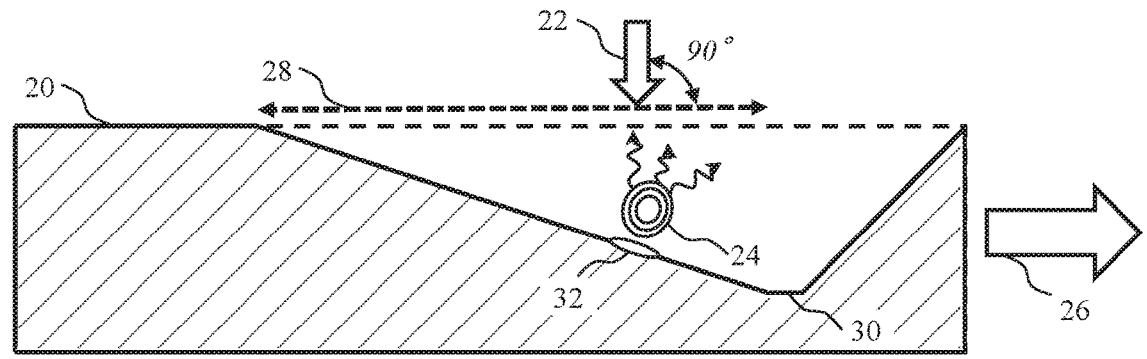

In one embodiment, FIGS. 3A and 3C show how the laser spot can be quickly scanned back and forth (e.g., with use of a laser scanning mirror to "steer" the laser shots) over a short line scan distance 28 (e.g., 0.5 cm, 1 cm) in the forward longitudinal direction and a rearward longitudinal direction opposite thereto, parallel to the core length as the core is slowly moved 26 relative to the laser 204 to allow the continuous scanning of the entire length of the core sample. The scanning movement of the laser spot is sufficiently fast to gradually deepen a portion of the ablated groove 30 over the entire line scan distance 28. In comparison to the method of overlapping laser shots described above, this produces a shallower slope on the leading groove edge, allowing the desired depth of ablation to be achieved while also keeping the laser beam within 0°-45° from normal to the surface of the groove's 30 leading edge, better preserving a small laser spot area 32 and maintaining a higher fluence. This also achieves better alignment between the plasma and the spectrometer light collection optics for systems with collinear laser and spectrometer optical paths.

Figure 4A:
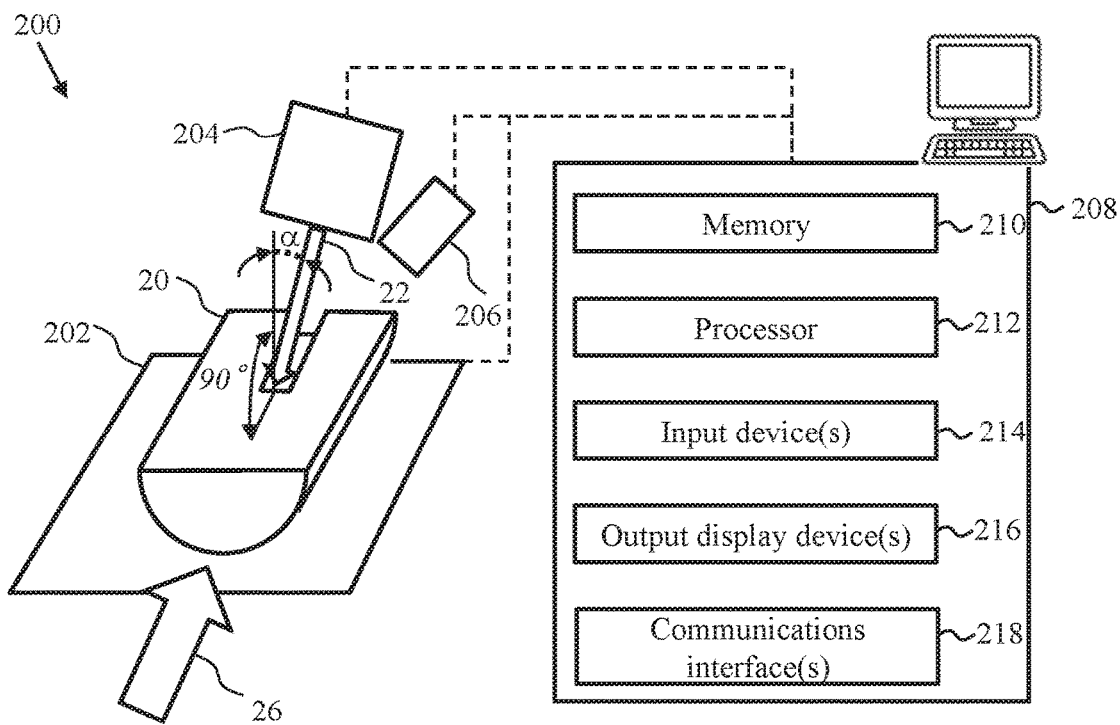
FIG. 4A (perspective view) and FIG. 4B (cross-sectional side view) are schematic depictions of embodiments of the present invention where the laser is directed toward the sample surface an angle substantially different from 90° (e.g., 45°) and overlapping laser shots produce an ablation groove as the sample is moved in relation to the laser spot.
Figure 4B:
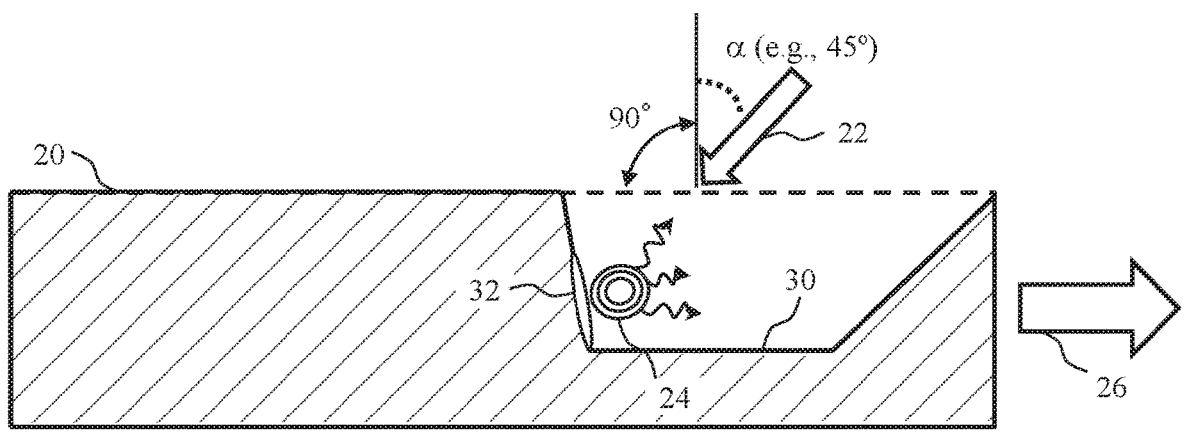
Figure 5A:
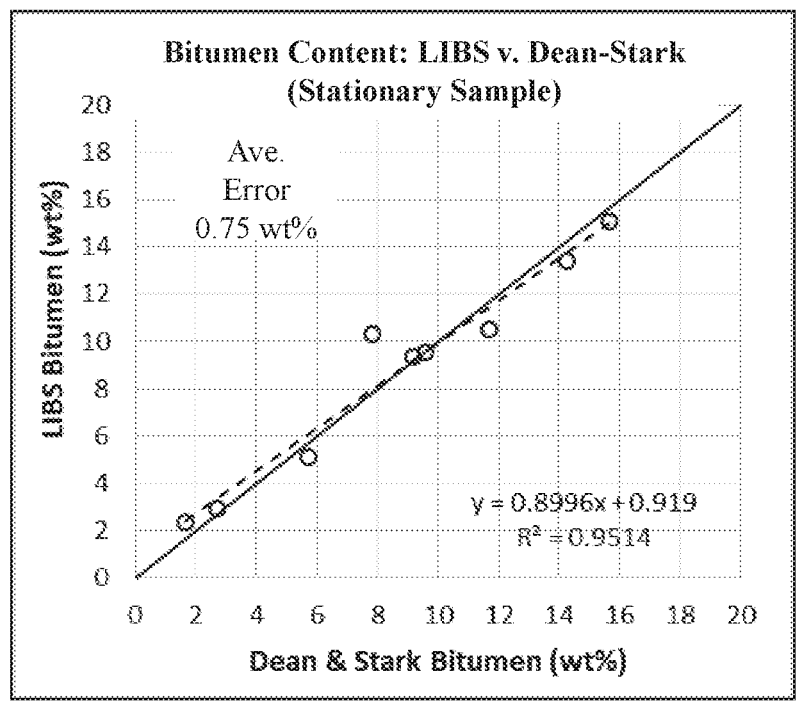
FIGS. 5A and 5B are charts comparing bitumen content (wt. %) as determined by a LIBS-based method of the present invention and by a Dean-Stark extraction method, for stationary oil sands ore samples (FIG. 5A) and simulated moving oil sands ore samples (FIG. 5B).
Figure 5B:
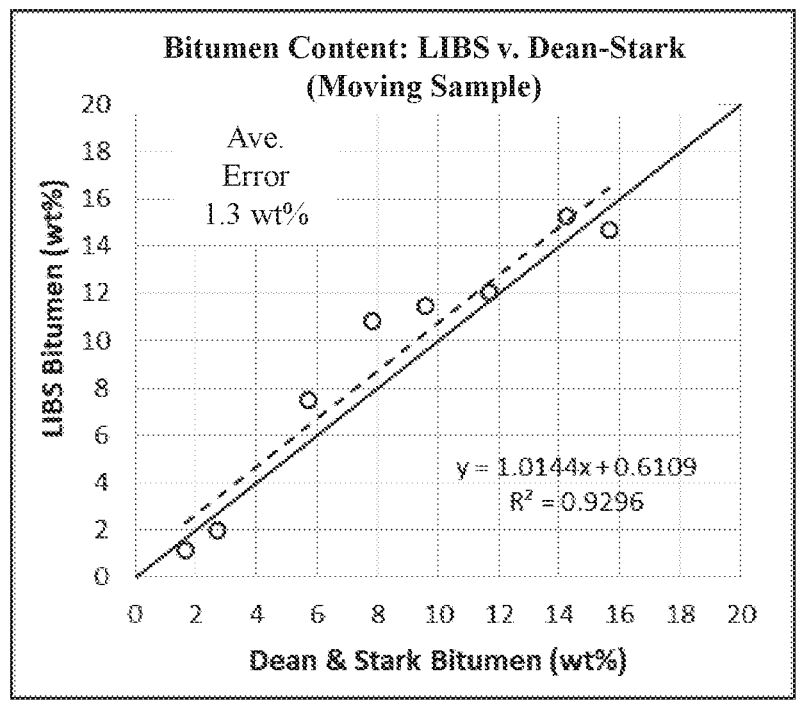
Figure 6A:
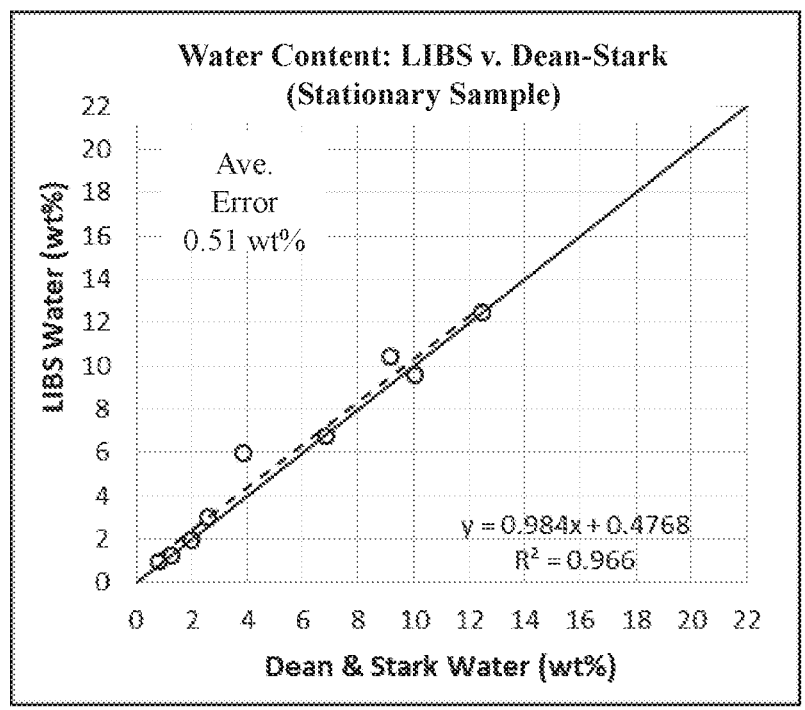
FIGS. 6A and 6B are charts comparing water content (wt. %) as determined by a LIBS-based method of the present invention and by a Dean-Stark extraction method, for stationary oil sands ore samples (FIG. 6A) and simulated moving oil sands ore samples (FIG. 6B).
Figure 6B:
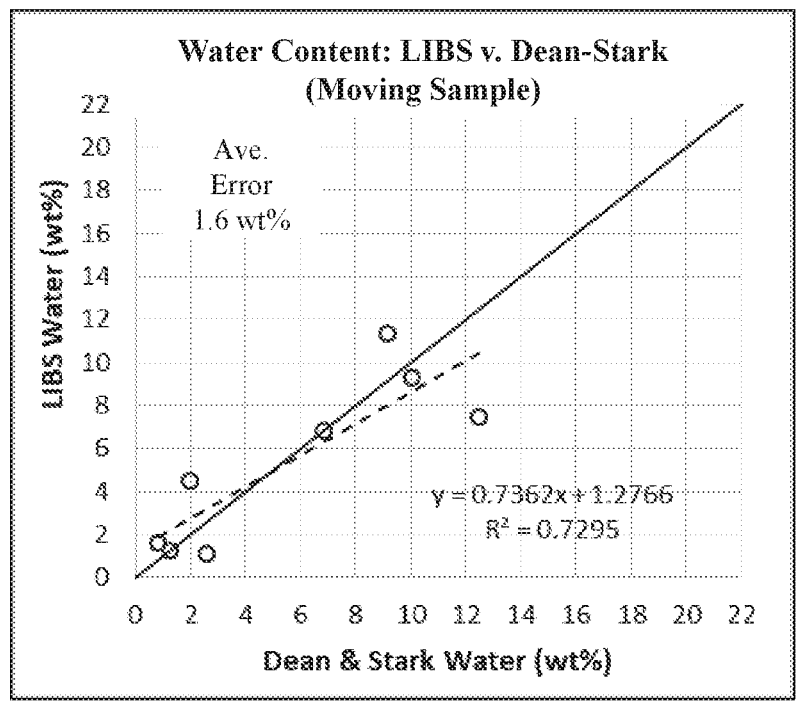
Figure 7A:
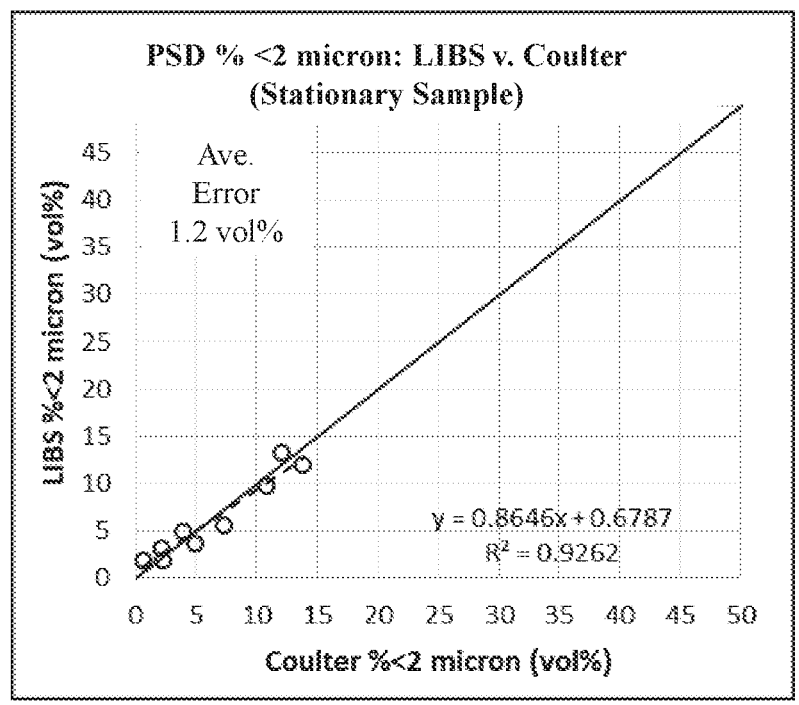
FIGS. 7A and 7B are charts comparing the content of particles less than 2 microns in size (vol. %) as determined by a LIBS-based method of the present invention and by a Coulter laser diffraction method, for stationary oil sands ore samples (FIG. 7A) and simulated moving oil sands ore samples (FIG. 7B).
Figure 7B:
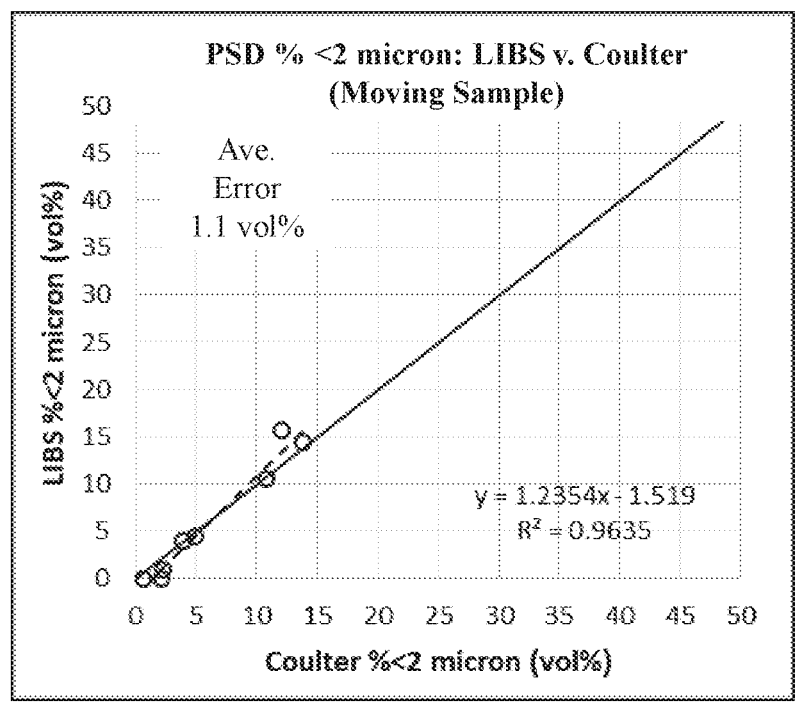
Figure 8:
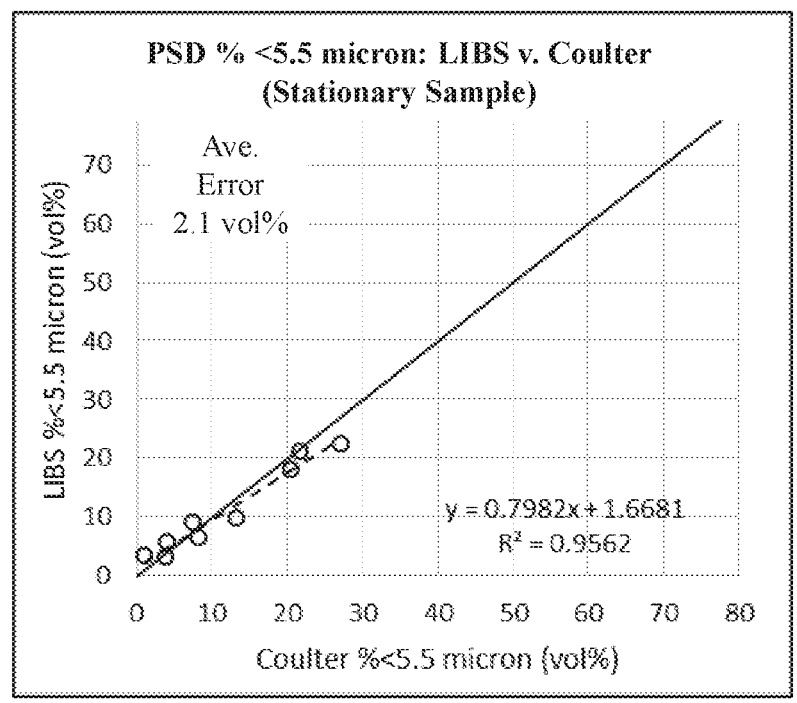
FIG. 8 is a chart comparing the content of particles less than 5.5 microns in size (vol. %) as determined by a LIBS-based method of the present invention and by a Coulter laser diffraction method for stationary oil sands ore samples.
Figure 9A:
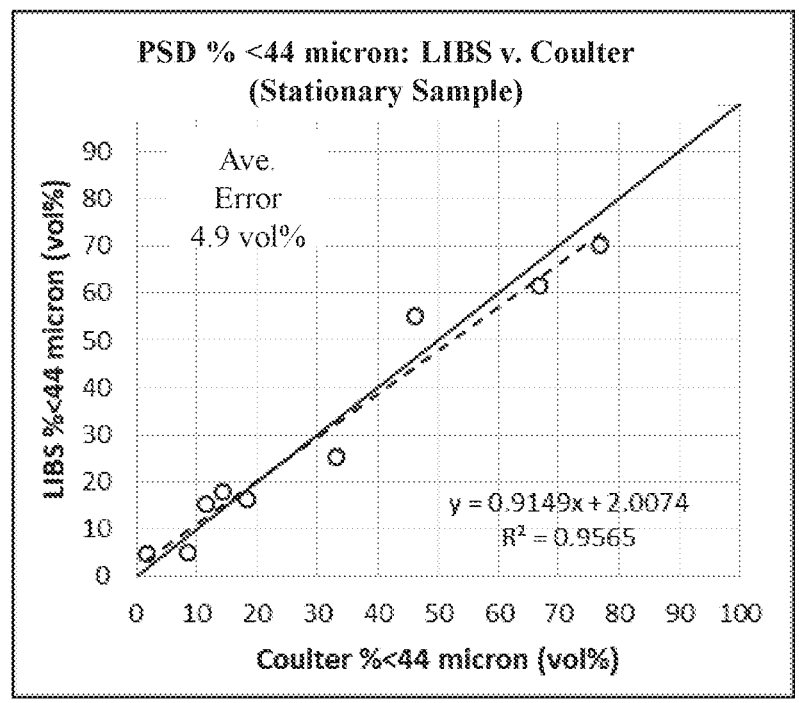
FIGS. 9A and 9B are charts comparing content of particles less than 44 microns in size (vol. %) as determined by a LIBS-based method of the present invention and by a Coulter laser diffraction method, for stationary oil sands ore samples (FIG. 9A) and simulated moving oil sands ore samples (FIG. 9B).
Figure 9B:
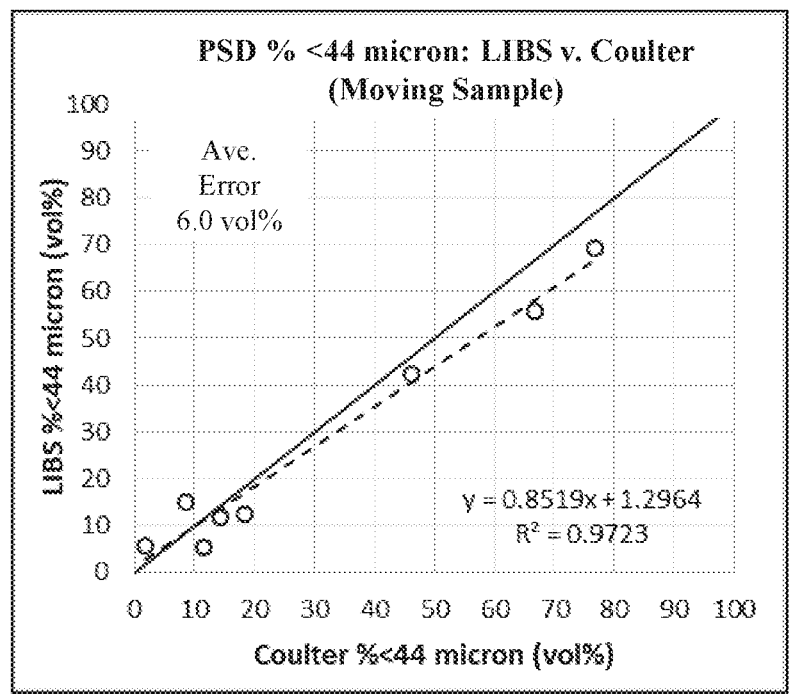
Figure 10:
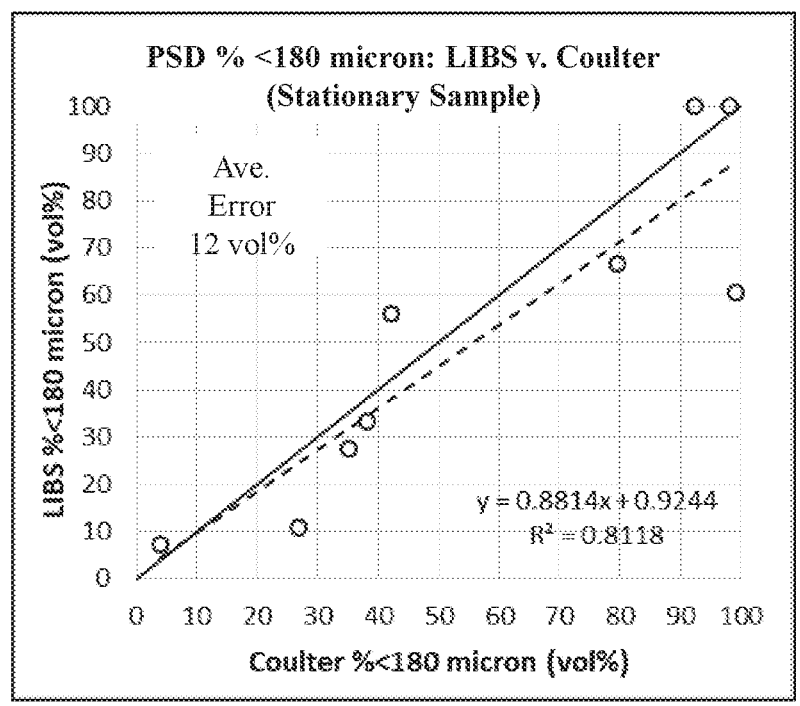
FIG. 10 is a chart comparing content of particles less than 180 microns in size (vol. %) as determined by a LIBS-based method of the present invention and by a Coulter laser diffraction method for stationary oil sands ore samples.
Figure 11A:
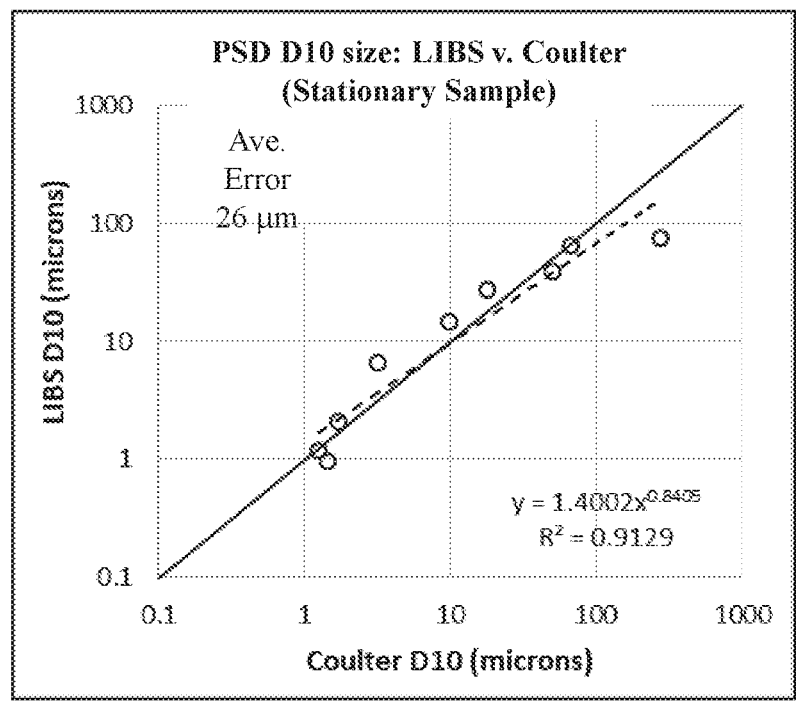
FIGS. 11A and 11B are charts comparing the $10^{th}$ percentile particle size (D10) as determined by a LIBS-based method of the present invention and by a Coulter laser diffraction method, for stationary oil sands ore samples (FIG. 11A) and simulated moving oil sands ore samples (FIG. 11B).
Figure 11B:
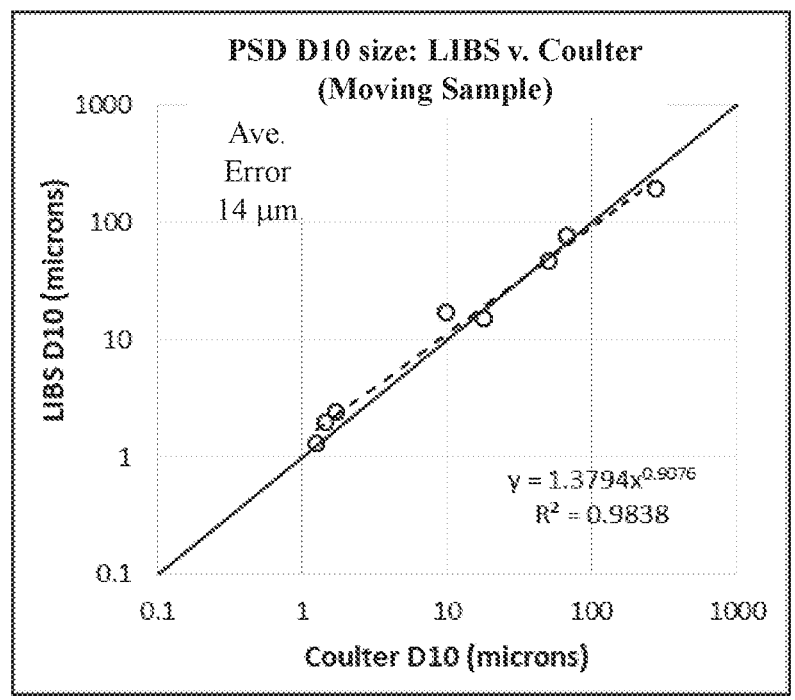
Figure 12A:
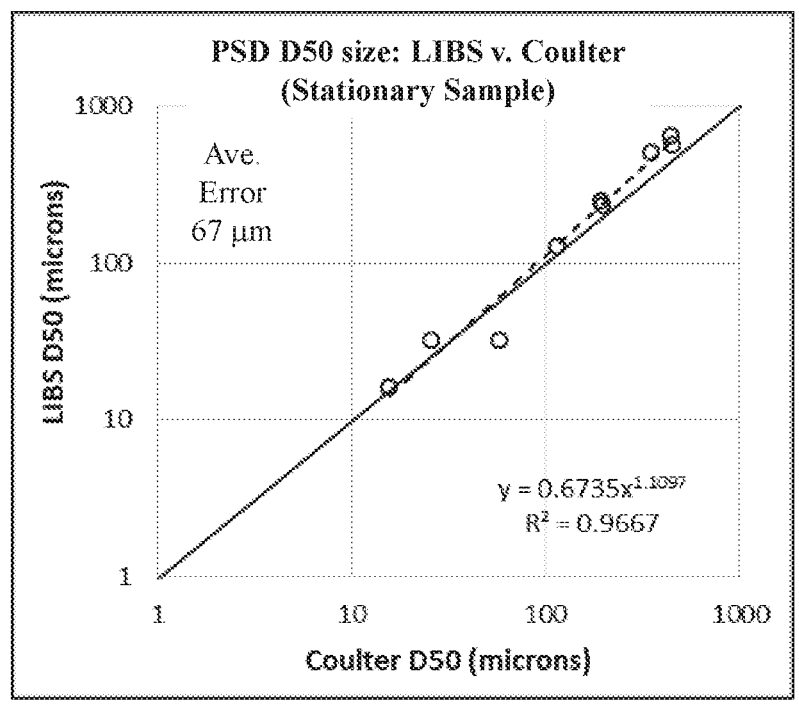
FIGS. 12A and 12B are charts comparing the 50$^{th}$ percentile particle size (D50) as determined by a LIBS-based method of the present invention and by a Coulter laser diffraction method, for stationary oil sands ore samples (FIG. 12A) and simulated moving oil sands ore samples (FIG. 12B).
Figure 12B:
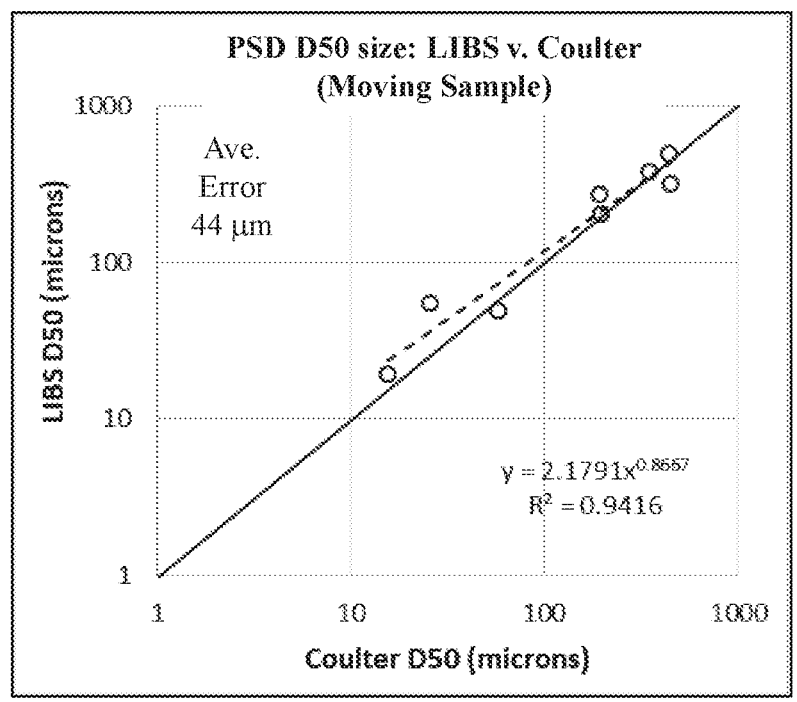
Figure 13A:
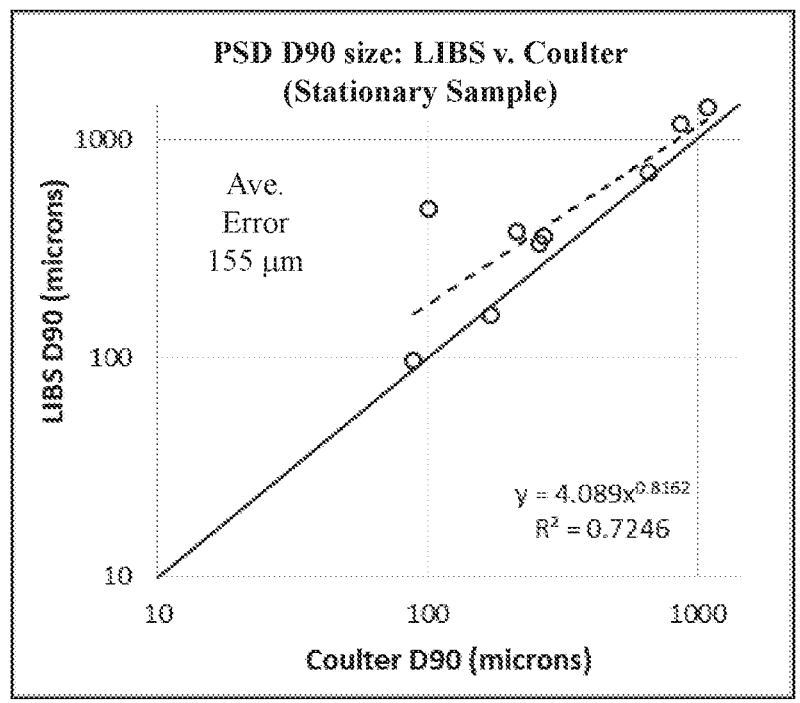
FIGS. 13A and 13B are charts comparing the 90$^{th}$ percentile particle size (D90) as determined by a LIBS-based method of the present invention and by a Coulter laser diffraction method, for stationary oil sands ore samples (FIG. 13A) and simulated moving oil sands ore samples (FIG. 13B).
Figure 13B:
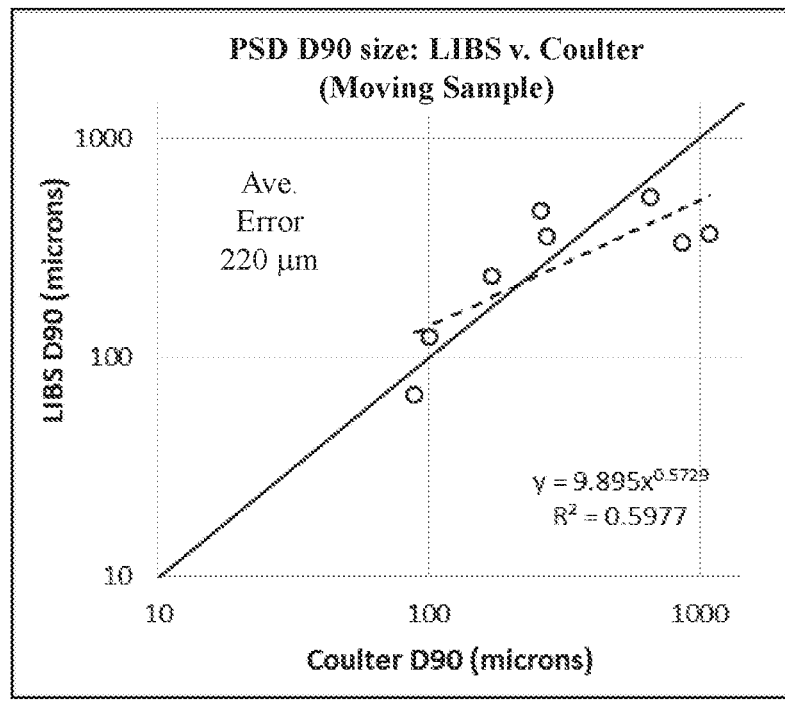
Figure 14A:
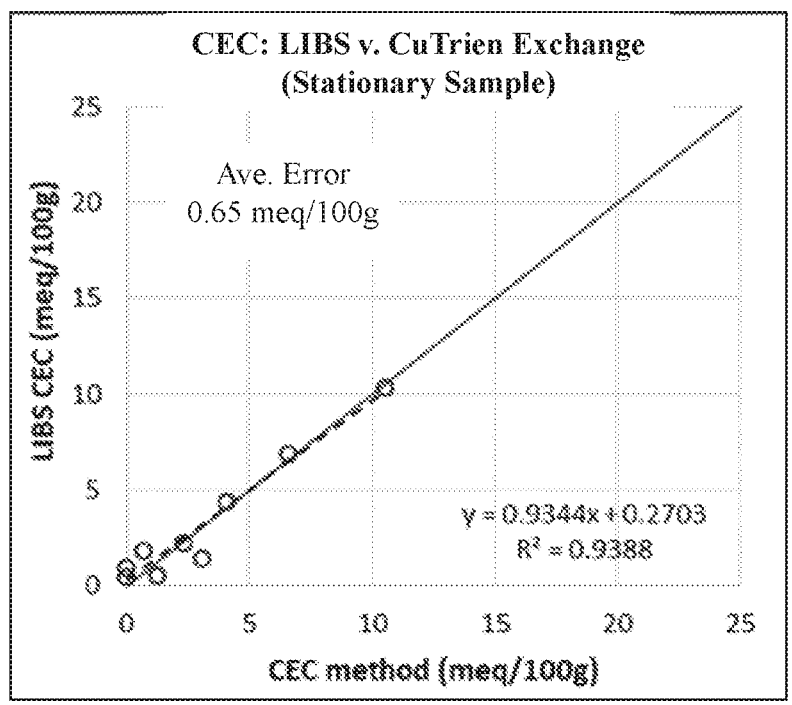
FIGS. 14A and 14B are charts comparing cation-exchange capacity (CEC) as determined by a LIBS-based method of the present invention and by a Cu-trien complex exchange method, for stationary oil sands ore samples (FIG. 14A) and simulated moving oil sands ore samples (FIG. 14B).
Figure 14B:
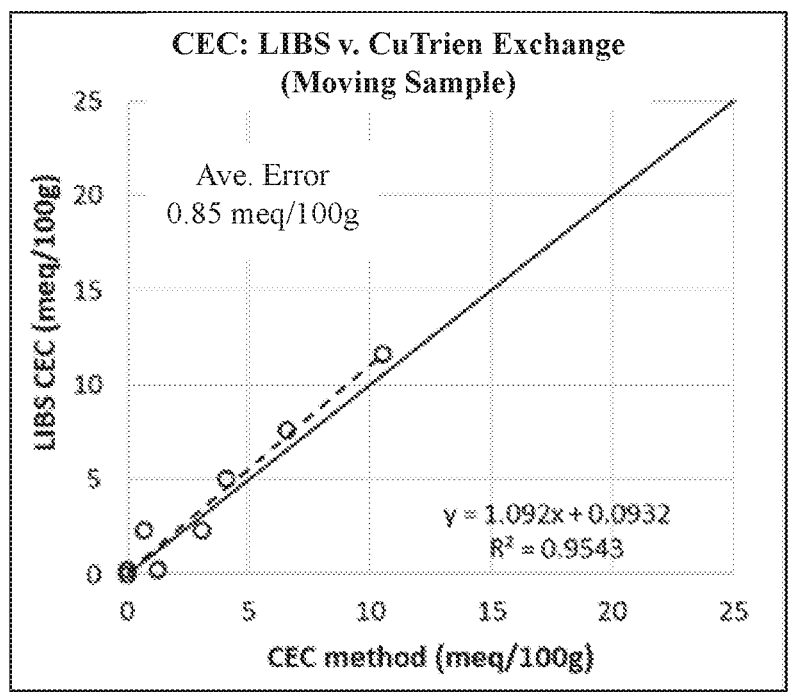
Figure 15A:
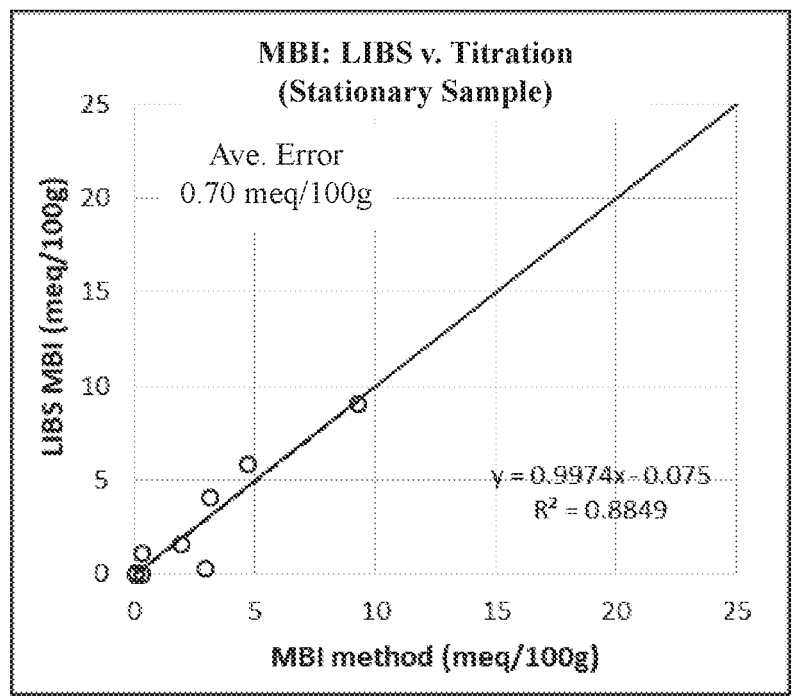
FIGS. 15A and 15B are charts comparing the methylene blue index (MBI) as determined by a LIBS-based method of the present invention and by a MBI titration method, for stationary oil sands ore samples (FIG. 15A) and simulated moving oil sands ore samples (FIG. 15B).
Figure 15B:
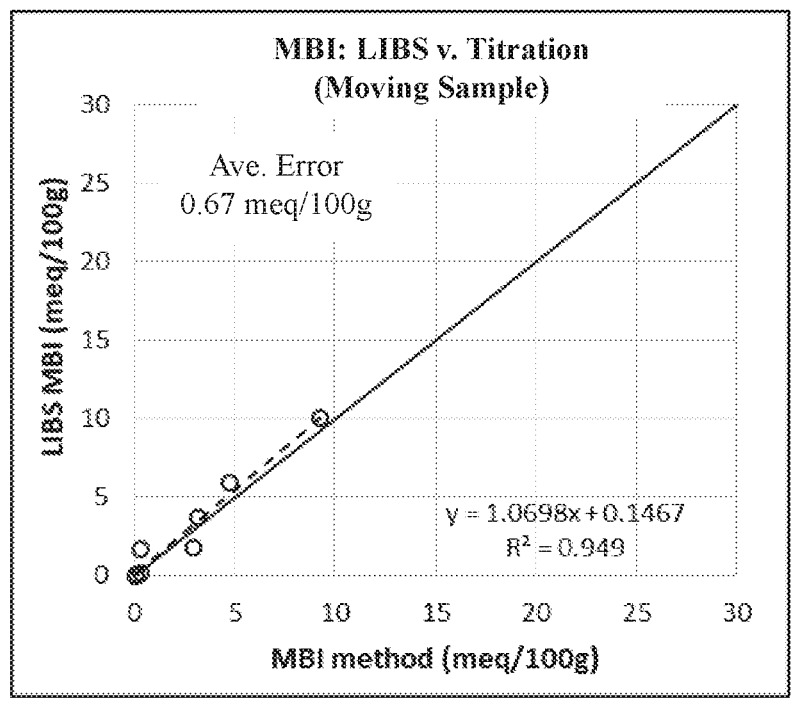
Figure 16A:
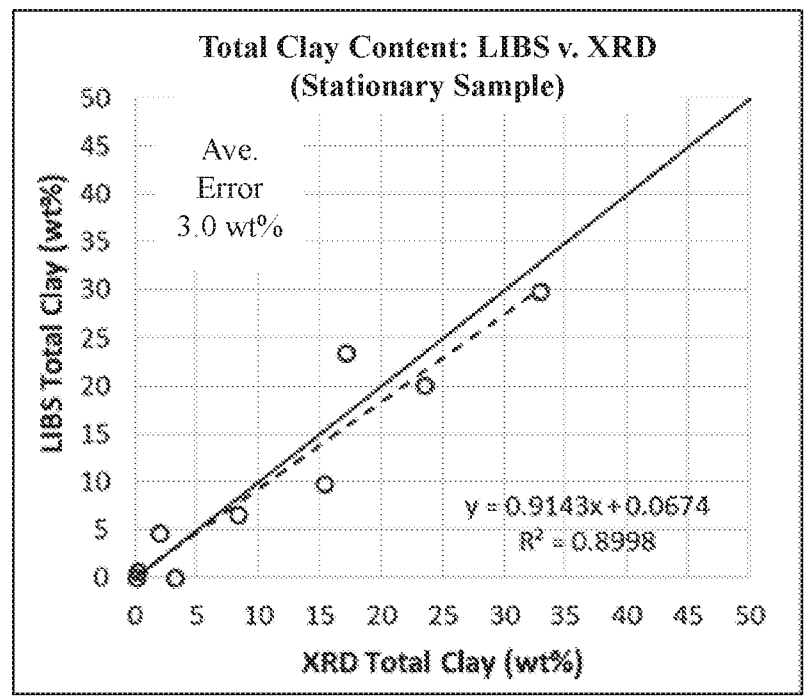
FIGS. 16A and 16B are charts comparing the total clay content (wt. %) as determined by a LIBS-based method of the present invention and by an X-ray diffraction method, for stationary oil sands ore samples (FIG. 16A) and simulated moving oil sands ore samples (FIG. 16B).
Figure 16B:
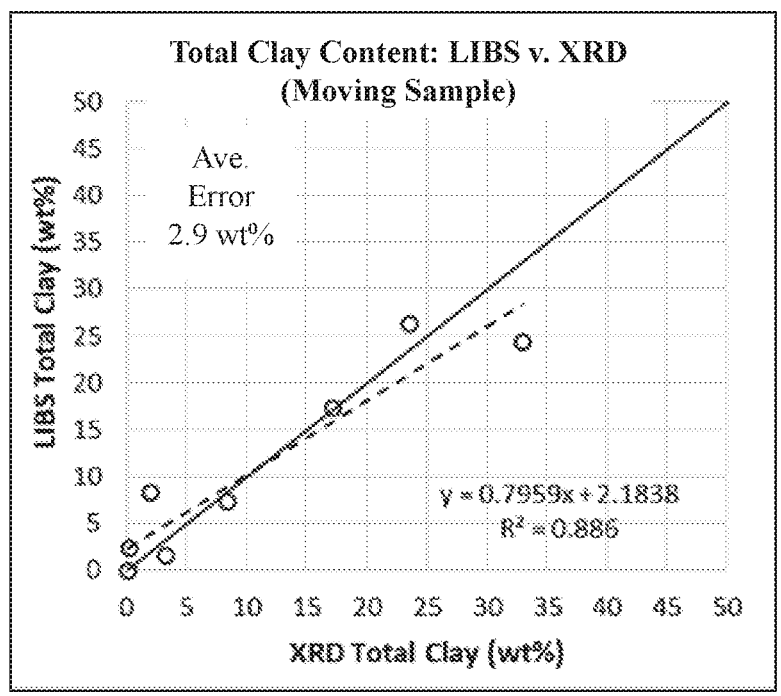
Figure 17:
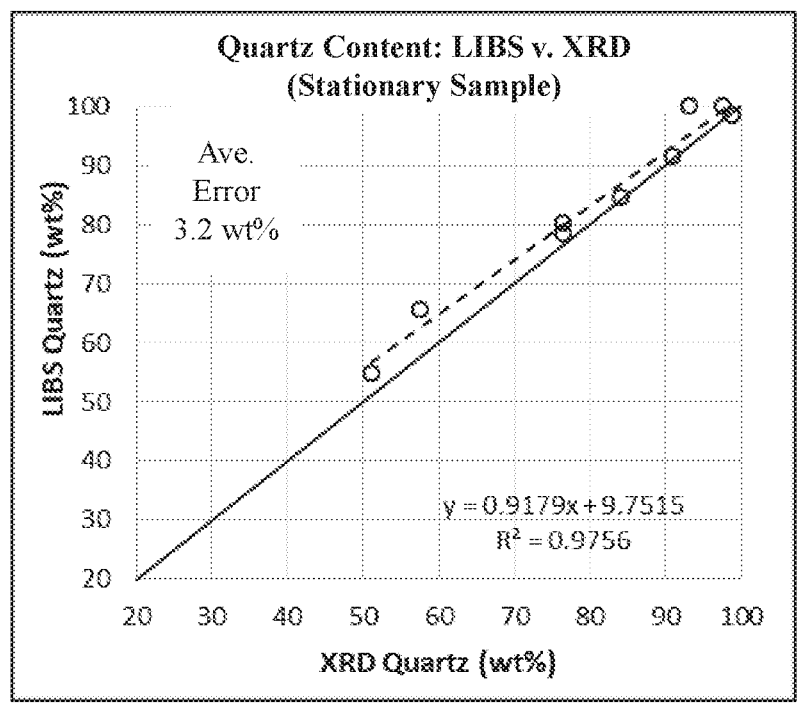
FIG. 17 is a chart comparing the quartz content (wt. %) as determined by a LIBS-based method of the present invention and by an X-ray diffraction method for stationary oil sands ore samples.
Figure 18A:
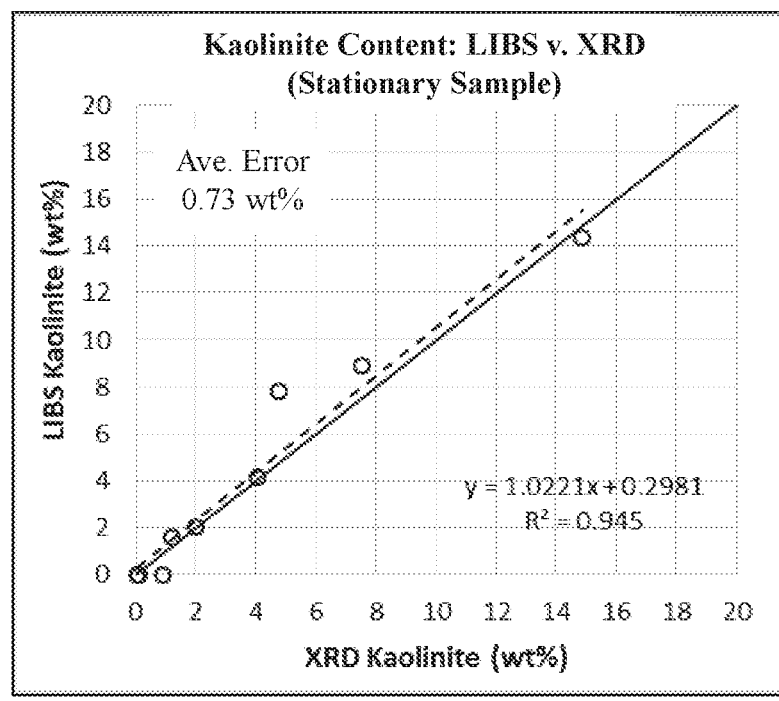
FIGS. 18A and 18B are charts comparing the kaolinite content (wt. %) as determined by a LIBS-based method of the present invention and by an X-ray diffraction method, for stationary oil sands ore samples (FIG. 18A) and simulated moving oil sands ore samples (FIG. 18B).
Figure 18B:
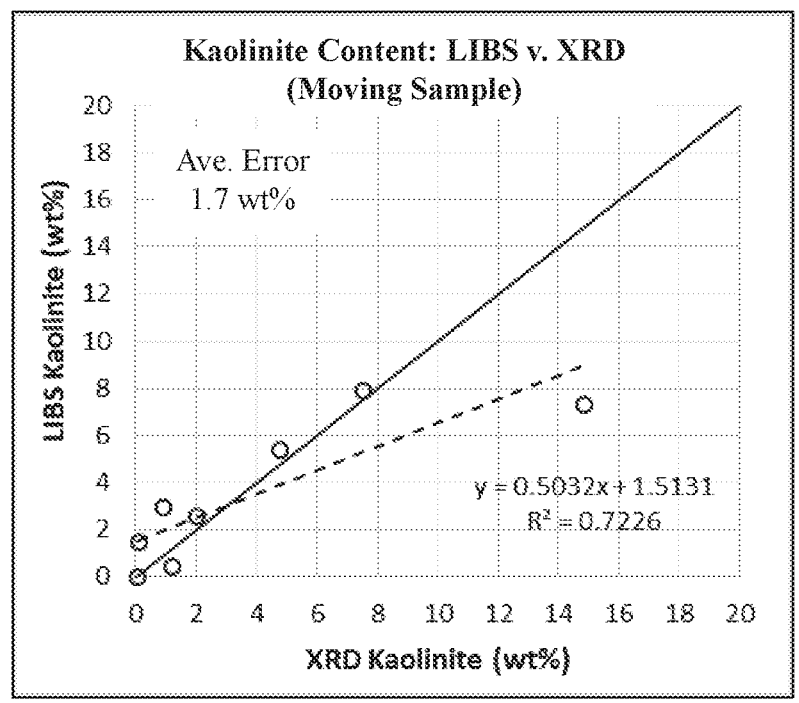
Figure 19A:
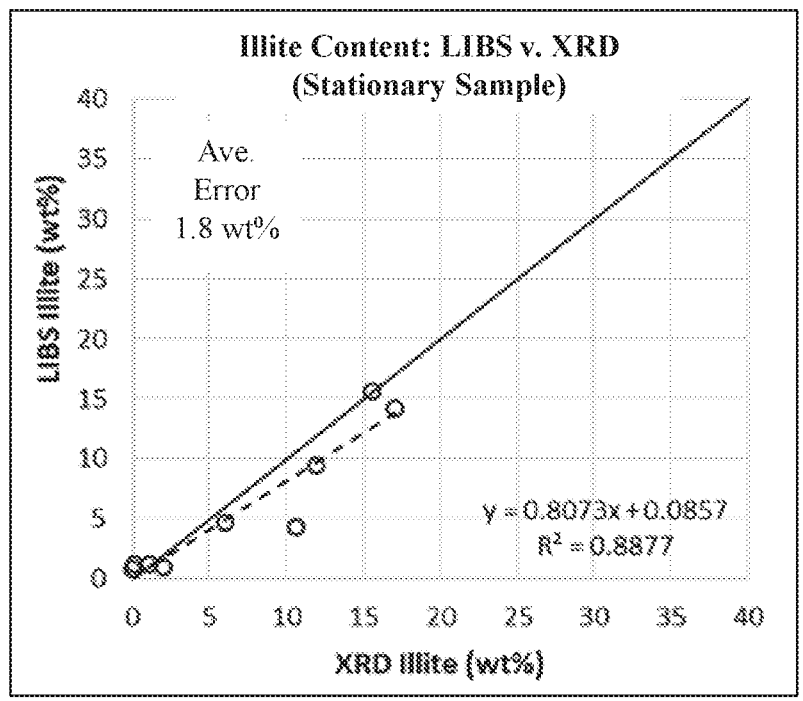
FIGS. 19A and 19B are charts comparing the illite content (wt. %) as determined by a LIBS-based method of the present invention and by an X-ray diffraction method, for stationary oil sands ore samples (FIG. 19A) and simulated moving oil sands ore samples (FIG. 19B).
Figure 19B:
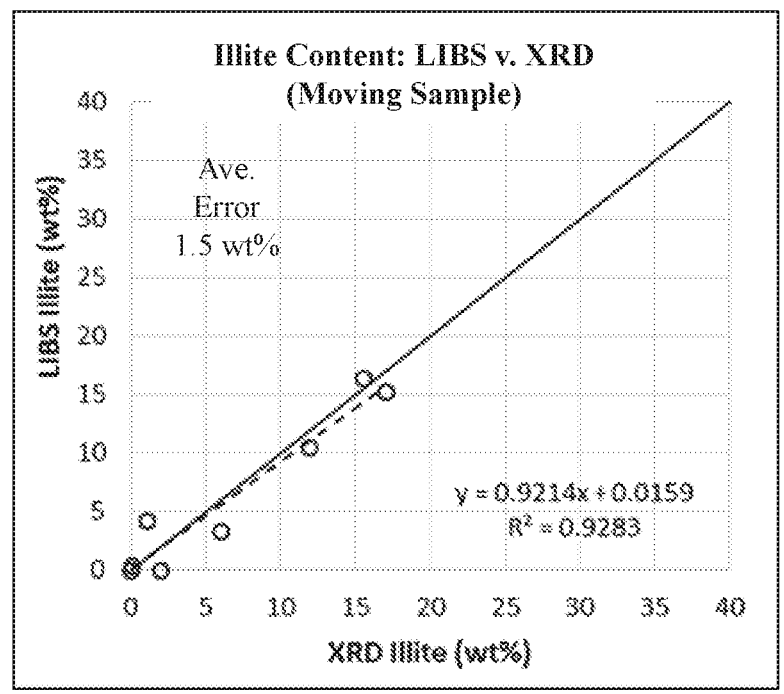
Figure 20:
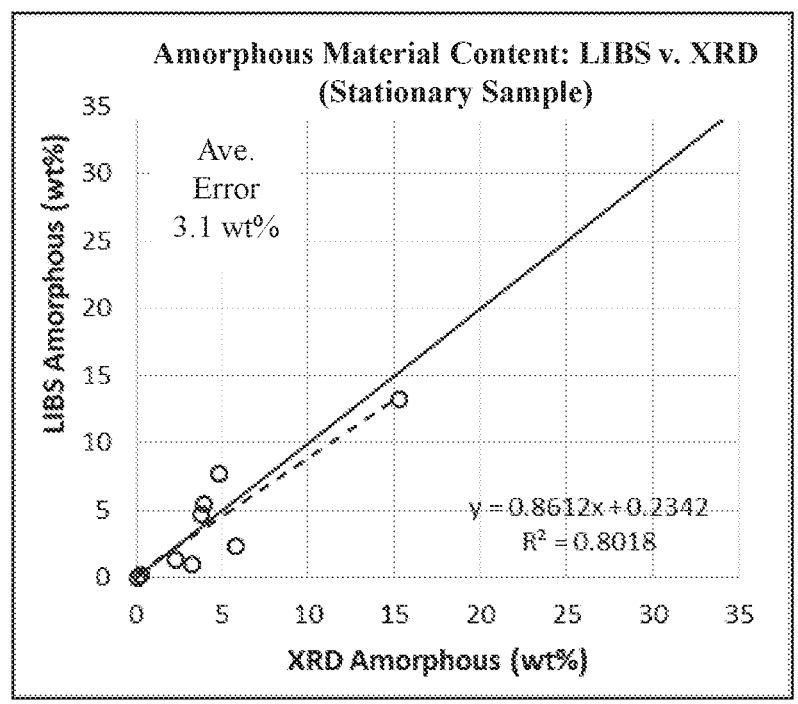
FIG. 20 is a chart comparing the amorphous material content (wt. %) as determined by a LIBS-based method of the present invention and by an X-ray diffraction method for stationary oil sands ore samples.
Figure 21A:
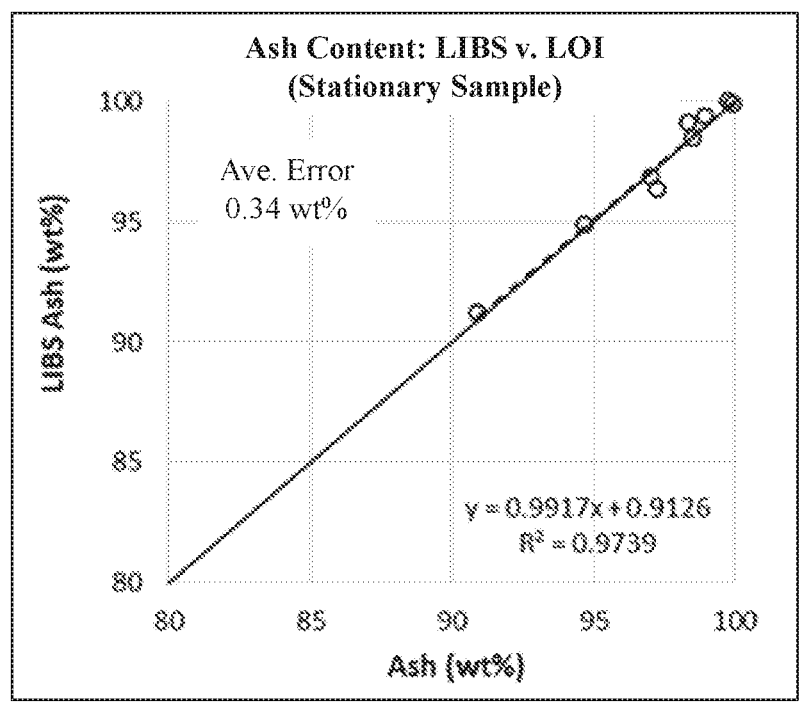
FIGS. 21A and 21B are charts comparing the total ash content (wt. %) as determined by a LIBS-based method of the present invention and by a loss-on-ignition-based method, for stationary oil sands ore samples (FIG. 21A) and simulated moving oil sands ore samples (FIG. 21B).
Figure 21B:
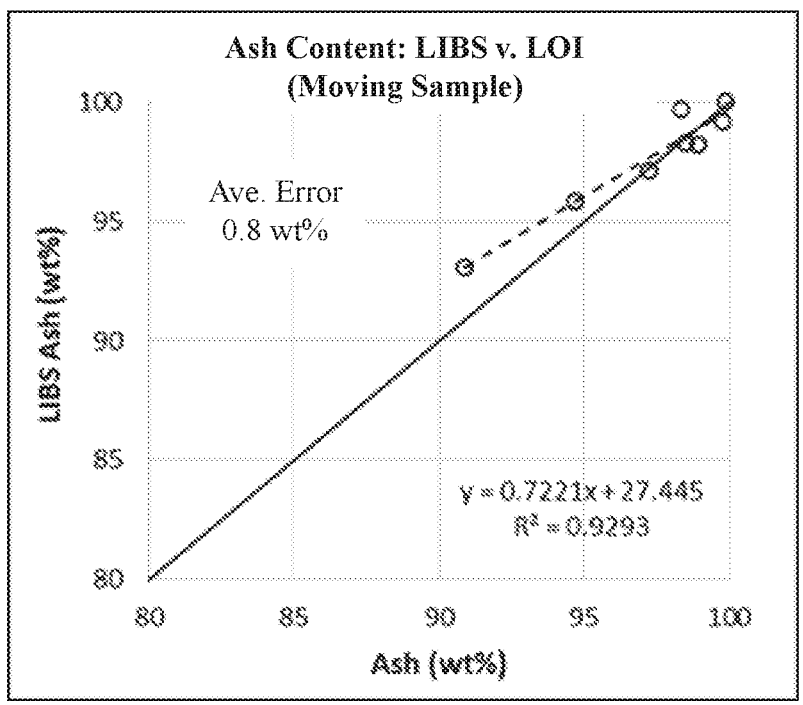
Figure 22:
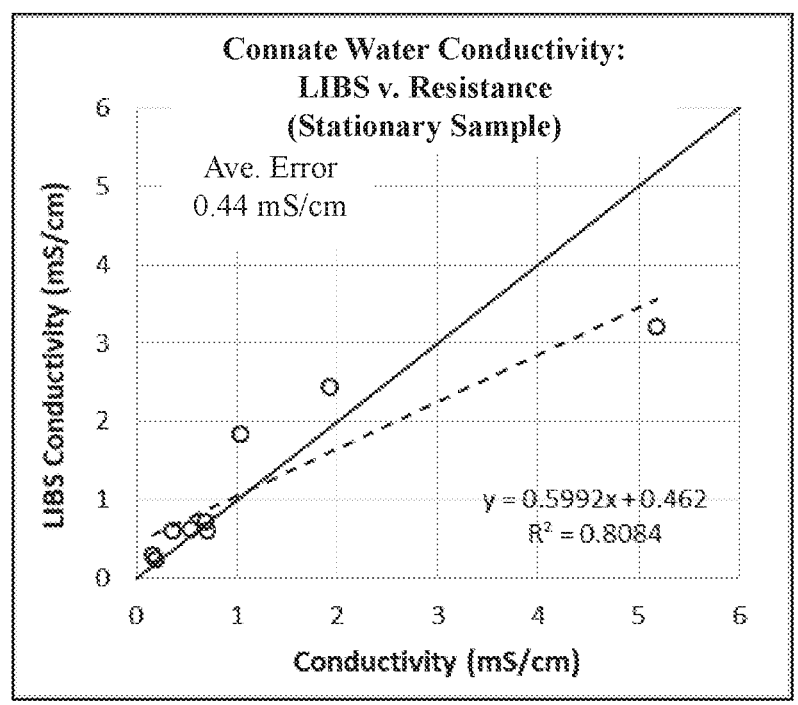
FIG. 22 is a chart comparing the connate water conductivity as determined by a LIBS-based method of the present invention and by a connate water extraction & electrical resistance-based method for stationary oil sands ore samples.
Figure 23:
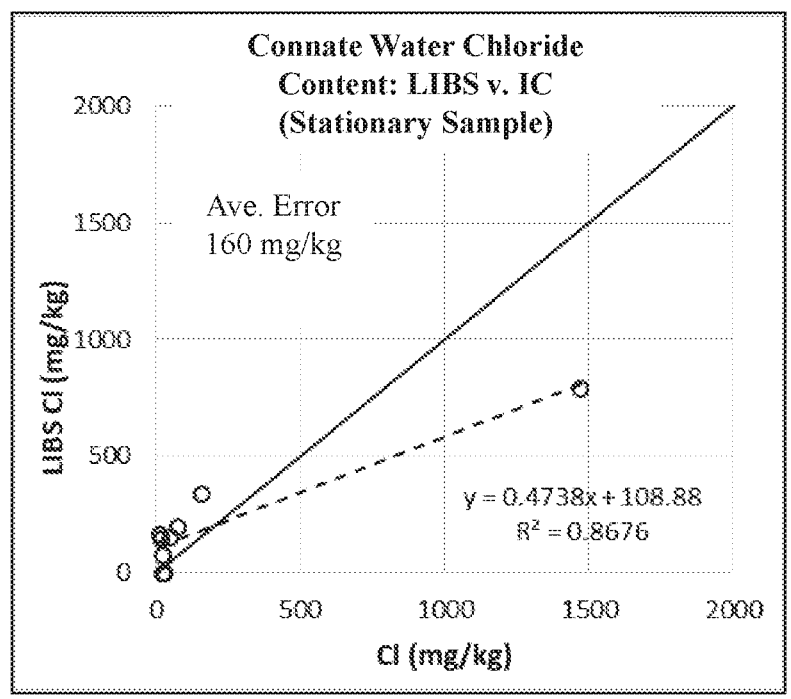
FIG. 23 is a chart comparing the connate water chloride content as determined by a LIBS-based method of the present invention and by a connate water extraction & ion chromatography (IC) method for stationary oil sands ore samples.
Figure 24:
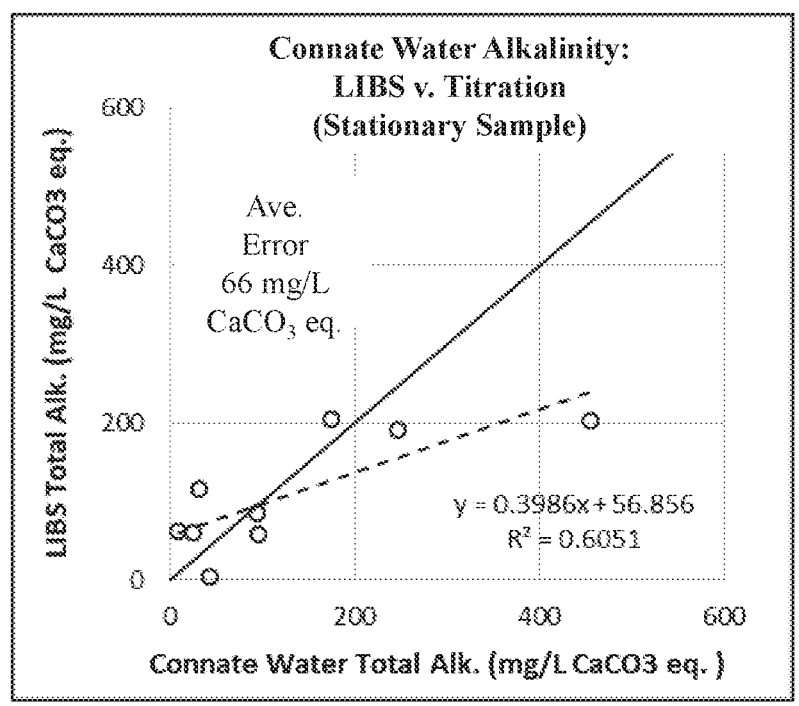
FIG. 24 is a chart comparing the connate water total alkalinity as determined by a LIBS-based method of the present invention and by a connate water extraction & titration method for stationary oil sands ore samples.

In another embodiment, FIGS. 4A and 4B show how the laser beam is directed at an angle, α, substantially different from normal to the original core surface (e.g., 45°), such that the laser beam 22 is pointing in the opposite direction 26 of the motion of the sample 20 (FIG. 4B). In this way, the laser spot will slowly move down the length of the core to achieve a desired depth of ablation while also keeping the laser beam within 0°-45° from normal to the surface of the groove's leading edge, where the laser spot area 32 is focused (FIG. 4B). In embodiments, the angle, α, may be at least 5°, 10°, 20°, 30°, or 40°. In other words, step 104 is repeated with the pulsed laser shots oriented relative to the normal to the surface of the test oil sands ore sample at an angle, α, of at least 5° and less than or equal to 45°, and fired in the direction opposite to the direction of motion 26 of the test oil sands ore sample in relation to the pulsed laser shots. The angle α may be selected such that the laser spot area 32 is as small as possible. If the laser spot area 32 does not cover the full height of the groove's 30 leading edge, a portion of the surface material originally positioned above the laser spot area 32 may fall into the laser spot area 32 and be analyzed, while another portion of this surface material may be ejected from the groove and not measured. An advantage of this embodiment is that no fast scanning mirror is required and the predicted parameters for the core at a given point along the core length is not the result of a moving average over the short line scan distance (e.g., 0.5 cm, 1 cm). This allows more accurate measurements of narrow features within the core. This also achieves better alignment between the plasma and the spectrometer light collection optics for systems with collinear laser and spectrometer optical paths.

In the Experimental Example, different lasers 204 were used for test oil sands ore samples, when analyzed as stationary samples and as simulated moving samples. For stationary samples 20, laser 104 was a Centurion™ laser (Quantel-Lumibird), which is a nanosecond Nd: YAG diode pumped solid state (DPSS) laser, having a wavelength of 1064 nm, a maximum energy of 25 mJ, a pulse duration of 6.8 ns, a pulse repetition rate of 100 Hz, and a beam diameter of 3 mm. Tests on stationary samples 20 were performed using an energy of 22 mJ, a laser spot diameter of 320 μm for a fluence of 27 J/cm$^2$, at a working distance of 300 mm. The optimum integration delay and gate were 0.8 μs and 1.1 ms, respectively. An air knife (e.g., EXAIR Corporation) and air exhaust was used for management of ejected particles.

For simulated moving samples 20, laser 104 was a Merion™ laser (Quantel-Lumibird), which is a nanosecond Nd: YAG diode pumped solid state (DPSS) laser, having a wavelength of 1064 nm, a maximum energy of 100 mJ, a pulse duration of between 6 to 9 ns, a pulse repetition rate of up to 400 Hz, and a beam diameter of 3.5 mm. Tests on simulated moving samples 20 were performed with an energy of 72 mJ, a laser spot diameter of 450 μm for a fluence of 47 J/cm$^2$, at a working distance of 500 mm. The optimum integration delay and gate were 1 μs and 1.1 ms, respectively. The air knife and air exhaust were used for ejected particle management.

Step 106.

Step 106 involves acquiring the emission spectra from at least some or all of the plasmas 24. Step 106 is performed using spectrometer 206 and instrument controller 208.

Spectrometer 206 detects light emissions from the plasma produced at the surface of sample 20, and converts the light emissions to an electronic signal. For example, spectrometer 206 may be configured to detect ionic, atomic, and molecular fragment emission spectra from plasma 24. In embodiments, spectrometer 206 may include one or several charge-coupled device (CCD) detector(s). In embodiments, the CCD is an intensified CCD (ICCD). In embodiments, spectrometer 206 may include one or several metal-oxide-semiconductor (CMOS) detector(s).

In embodiments, spectrometer 206 includes collection optics configured to direct emissions from the plasma to spectrometer 206. The collection optics may include reflective and/or semi-reflective collection optics, such as, but not limited to, a lens, a mirror, a beam splitter, a polarizing beam splitter, and the like. Some portion of the laser 204 and spectrometer 206 optics may be shared (i.e., collinear).

In the Experimental Example, light emitted by plasma 24 was reflected by a dichroic filter, and was focused on the entrance of an optical fiber bundle by an achromatic lens. The optical fiber bundle (comprising 14 individual fibers of 100 μm core diameter) guided the light into two legs (7 aligned optical fiber each) at the end. The two outputs were connected to the two entrances of a dual channel spectrometer (Avantes BV). Different spectrometers 206 were used for stationary samples and simulated moving samples.

For stationary test oil sands ore samples, spectrometer channel 1 was a 75 mm Czerny-Turner type UV/VIS spectrometer with a covered spectral range of approximately 230 nm to 458 nm using a linear ILX554 B™ CCD detector with 2048 elements (Sony Corporation). Spectrometer channel 2 was a VIS/NIR spectrometer with a covered spectra range of 460 to 950 nm (VIS/NIR).

For stationary test oil sands ore samples, the spectrometer was a dual channel EVO™ spectrometer (Avantes BV). Spectrometer channel 1 was a 75 mm Czerny-Turner type UV/VIS spectrometer with a covered spectral range of approximately 220 nm to 500 nm using a CMOS detector with 2048 elements. Spectrometer channel 2 was a VIS/NIR spectrometer with a covered spectra range of 200 to 1300 nm (VIS/NIR), but only the 460 to 900 nm range was used.

Repetition of steps 104 and 106.

Steps 104 and 106 are repeated on one or more ablation sites until optionally a predetermined minimum total ablation volume, or optionally a minimum ablation depth, of the test oil sands ore sample 20 have been achieved.

In each instance of step 104, laser 204 may ablate a very thin (e.g., on the order of tens of microns) surface layer of sample 20, resulting in a shallow crater. In repeating step 104, up to thousands of pulsed laser shots may be used to ablate to a cumulative depth. The cumulative depth range will depend on the number of laser shots, and the laser parameters. The need for adequate sampling depth may be balanced against the need for fast analysis times, and repeatable, high quality signals. With current widely-available lasers, it may be challenging to achieve sufficient overlapping shots to meet minimum ablation depths for fast moving samples (e.g., ore on a conveyor), but better accuracy can be obtained when this is achievable. In repeating step 106, emission spectrum from each short-lived plasma 24 is collected.

Due to the heterogeneous nature of oil sand, where surface properties and surface component concentrations may not accurately represent bulk properties and compositions, LIBS sampling depth should be on the order of 0.4 to 5 mm, with total ablated volumes of 0.3 cm$^3$ or greater to produce the best accuracy. The optional minimum total ablated volume may be achieved by laser sampling multiple positions across the surface of sample 20. This is to minimize sampling errors associated with solid particles of various particle sizes, surface-coatings of various thicknesses of bitumen and/or water, moisture loss from surface drying, and bitumen and/or water flow toward or away from the surface in high porosity oil sand. The minimum sampling depth and volume may change according to sample characteristics and conditions. For example, where the oil sand is freshly homogenized (e.g., freshly crushed ore on a conveyor), analyzing only the top surface may still produce satisfactory results. Where the oil sand surface has aged for hours or days (e.g., core samples in the lab, exposed mine face that has not been recently excavated), lower accuracy may be expected if minimum ablation depths are not achieved due to surface drying and flow of bitumen and/or water to or from the sample surface.

In the Experimental Example, for stationary samples, motorized stage 202 moved the sample at speed of 1 mm/s over a 150 mm total linear path while laser 204 was fired at 100 Hz. A total of 15000 spectra were collected using 5 lines scans of 3000 shots each and ablation depths ranged from about 0.4 mm to 2 mm for the stationary samples. For simulated moving samples, the freshly prepared sample was moved at a speed of 250 mm/s while laser 204 was fired at 100 Hz for a total duration of 50 seconds. A total of 5000 spectra were collected and ablation depths were less than 0.1 mm due to minimal overlapping shots for the simulated moving samples.

Step 108.

Step 108 involves averaging the acquired emission spectra together for the test oil sands ore sample to form a test emission spectrum. Step 108 is performed by processor 212 executing instructions in memory 210. In some cases, it may be advantageous to reject spectra deemed to be of poor quality based on various possible criteria (e.g., minimum total light intensity, minimum signal to noise ratio(s), minimum specific emission line intensities, ratio of specific line intensities) so that they are not averaged together with the remaining higher quality spectra. In the Experimental Example, custom algorithms developed in the LabVIEW 2015™ software application (National Instruments, Austin, Tex., USA), and the Matlab 2018b™ environment (MathWorks Inc., Natick, Mass., USA) were used to disregard the less significant spectra of poor quality/intensity.

In the Experimental Example, for stationary samples, 5 groups of 3000 spectra each were averaged together for a total of 15000 spectra per sample. For simulated moving samples, the 5000 spectra collected for each sample were averaged together.

Step 110.

Optional step 110 involves preprocessing the test emission spectrum. Step 110 is performed by processor 212 executing instructions in memory 210. In some cases, it may be advantageous to optionally preprocess the individual spectra before they are averaged together for a given sample, as discussed above in step 108.

Preprocessing the test emission spectrum may involve applying methods of normalization, weighting, noise-reduction, or other mathematical manipulations to produce a processed test emission spectrum that can be more readily modelled by chemometric methods. Preprocessing methods are well-known to those skilled in the art, and may be implemented with commercially available software products.

Preprocessing the test emission spectrum may also involve limiting the test emission spectrum to particular spectral regions. The relevant chemical information for measuring the at least one oil sands property of interest may be concentrated in those specific spectral regions of the emission spectra where the emission lines of certain elements and/or molecular fragments may be found.

For example, spectral data preprocessing may be performed using optimization routines with the OPUS™ software (Bruker Ltd., Milton, Calif., USA) to help identify spectral regions and spectral pre-processing techniques that were the most useful for reducing the chemometric model's root mean squared error (see step 112).

In the Experimental Example, typically the entire averaged test emission spectrum was used, except where a limited number of variables are indicated in Table 2, as discussed below for step 112.

Step 112.

Step 112 involves determining the property or properties of interest by applying, to the test emission spectrum, at least one calibration loading obtained from a chemometric model relating an emission spectrum, or a portion of an emission spectrum, obtained from a known oil sands ore sample to a reference value obtained from a physicochemical analysis method for determining the at least one property of interest of the known oil sands ore sample. Step 112 is performed by processor 212 executing instructions in memory 210.

In one embodiment, the chemometric model comprises a calibration model produced by multivariate regression or pattern recognition methods of emission spectra of a training set of known samples. The obtained chemometric model describes the relationship between the property of interest, and the intensities of emission spectra collected from the plasma of the known oil sands ore samples, which are subjected to steps 102 to 110 in a like manner as test oil sands or sample 20. Chemometric classification methods may also be used to group oil sand samples into useful classes having numerical ranges of the property of interest, rather than to determine a particular value of the property of interest. Regression analysis and pattern recognition methods are well known in the art, and may be implemented using commercially available software products. Suitable methods include, without limitation, Support Vector Machine (SVM) methods, Principal Component Regression (PCR) methods, Partial Least Squares Regression (PLSR) methods, Artificial Neural Networks (ANN) and Locally Weighted Regression (LWR) methods. For example, chemometric models may be obtained with use of software packages such as Unscrambler X™ version 10.3 software (Camo Analytics; Montclair, N.J., USA), MATLAB 2018b (Mathworks Inc.; Natick, Mass., USA) along with the Machine Learning Toolbox and PLS Toolbox™ (Eigenvector Research Inc.; Manson, Wash., USA). In some cases, it may be advantageous to mathematically alter the physiochemical method reference values before developing the chemometric models. One example is taking the logarithm of reference values that span multiple orders of magnitude (e.g., D10, D50, D90). Another example is calculating the difference of the value from 100% (e.g., ash content).

Once a test emission spectrum for sample 20 has been obtained, calibration loadings obtained from the chemometric model were applied to the test emission spectrum to determine a value for the property of interest of sample 20. In some cases, it may be advantageous to develop and apply multiple calibration models for a given physiochemical parameter that cover different reference value ranges. One example is using one CEC chemometric model for samples with CEC values predicted by the model to be greater than 5 meq/100 g. If this model predicts that a sample has a CEC value less than 5 meq/100 g, then a different model specific to samples with CEC values <5 meq/100 g is used to predict the CEC value with enhanced accuracy. In some cases, it may be advantageous to determine the physiochemical parameter from individual or small groups of optionally preprocessed spectra before averaging the contributions from multiple spectra together. In this way, like-spectra of certain features on the sample (e.g., clay lens) can be processed through appropriate chemometric model(s) before the overall sample composition is determined by including contributions from other sample features with like-spectra (e.g., bitumen-rich regions). Classification-based tools or other suitable means may be used to classify different sample features for this purpose.

In the Experimental Example, 40 oil sands ore samples ("total samples") were considered having a variety of compositions. The total samples were subjected to analysis by physicochemical analysis methods to determine a reference value for the properties of interest. All of the total samples were also subjected to LIBS in accordance with steps 108 to 110 method to acquire their respective LIBS-based emission spectra. This was performed both for the sample as a stationary sample, and as a simulated moving sample, as described above. Table 1 summarizes the operating parameters used for both stationary and simulated moving samples 20, as described above.

TABLE 1

| Parameter | Stationary Sample | Simulated Moving Samples |
|---|---|---|
| Laser shots | 5 × 3000 | 5000 |
| Wavelength (nm) | 1064 | 1064 |
| Pulse duration (ns) | 6.8 | 6 to 9 |

TABLE 1-continued

| Parameter | Stationary Sample | Simulated Moving Samples |
|---|---|---|
| Pulse repetition rate (Hz) | 100 | 100 |
| Pulse energy (mJ) | 22 | 75 |
| Spot diameter (μm) | 320 | 450 |
| Fluence (J/cm$^2$) | 27 | 47 |
| Working distance (mm) | 300 | 500 |
| Linear scan speed (mm/s) | 1 | 250 |
| Purge | Air knife | Air knife |

In Table 1, "laser shots" refers to the total number pulsed laser shots applied to the sample surface. "Wavelength" refers to the wavelength of each pulsed laser shot. "Pulse duration" refers to the duration of each pulsed laser shot. "Pulse repetition rate" refers to the frequency of successive pulsed laser shots. "Pulse energy" refers to the energy of each pulsed laser shot. "Spot diameter" refers to the diameter of a circular area of incidence of each pulsed laser shot on a sample surface. "Fluence" is determined by dividing the pulse energy by the area of incidence defined by the spot diameter. "Working distance" refers to the distance between the front lens and the sample surface. "Linear scan speed" refers to the speed at which the sample surface was moved in relation to the laser shots. "Purge" refers to the type of gas purge used to manage ejected particles in the vicinity of the sample surface.

Among the 40 total samples, 30 oil sands ore samples ("calibration samples") were used to obtain the chemometric model relating their reference values for their properties of interest to their LIBS-based emission spectra. That is, the calibration samples served as "known samples." The calibration modelling was performed using the Unscrambler X™ version 10.3 software (Camo Analytics; Montclair, N.J., USA), MATLAB 2018b (Mathworks Inc.; Natick, Mass., USA), along with the Machine Learning Toolbox and PLS Toolbox™ (Eigenvector Research Inc.; Manson, Wash., USA). In some cases, it may be advantageous to exclude a very small number of samples from the calibration set if, for example, they appear to be an outlier from the remaining sample population or there is reason to believe that there was an issue with the physiochemical analysis measurement for that/those sample(s).

Among the 40 total samples, the remaining 10 samples ("validation samples") (i.e., exclusive of the calibration samples) served as "test oil sands ore samples." The obtained chemometric models were applied to their test emission spectra to determine LIBS-based values of the properties of interest in accordance with step 112. The LIBS-based values and reference values of the properties of interest were compared to evaluate the accuracy of the LIBS-based method, in terms of a coefficient of determination value ("$R^2$ value"). After such analysis, one of the 10 validation samples was excluded as a clear outlier sample. This outlier sample was qualitatively described as "a massive black clay, carbonaceous", and had an amorphous material content of about 25%, which was about 60% more than that of the next highest sample. Accordingly, the analysis of the $R^2$ value was re-analyzed based only on the remaining 9 validation samples.

Table 2 summarizes, for the 9 validation samples, the physiochemical analysis methods used to analyze different properties of interest, the Figure references comparing the property of interest as determined by the LIBS-based method of the present invention and the physicochemical analysis method, the regression models used to obtain the chemometric models, and the $R^2$ values. The referenced Figures show the average error of the property of interest as determined by the LIBS-based method and the physicochemical analysis method.

TABLE 2

| Property | Physiochemical Method | Stationary Sample | | | Simulated Moving Samples | | |
|---|---|---|---|---|---|---|---|
| | | Fig. | Regression Model | $R^2$ | Fig. | Regression Model | $R^2$ |
| Bitumen content (wt. %) | Dean-Stark extraction | 5A | PLS, SNV, MC, excluded 1 calibration sample, rank 3 | 0.9514 | 5B | PLS, SNV, unit variance, 66 variables, excluded 2 calibration samples, rank 2 | 0.9296 |
| Water content (wt. %) | Dean-Stark extraction | 6A | PLS, area norm, unit variance, excluded 2 calibration samples, rank 5 | 0.966 | 6B | PLS, area norm, unit variance, 2874 variables, rank 5 | 0.7295 |
| % < 2 microns (vol. %) | Coulter laser diffraction | 7A | PLS, 1$^{st}$ der, rank 2 | 0.9262 | 7B | PLS, area norm, 1$^{st}$ der, rank 2 | 0.9635 |
| % < 5.5 microns (vol. %) | Coulter laser diffraction | 8 | PLS, 1$^{st}$ der, rank 2 | 0.9562 | | Not analyzed | |
| % < 44 microns (vol. %) | Coulter laser diffraction | 9A | PLS, SNV, MC, excluded 2 calibration samples, rank 3 | 0.9565 | 9B | LWR, SNV, MC, 869 variables, 50 local points, 3 latents | 0.9723 |
| % < 180 microns (vol. %) | Coulter laser diffraction | 10 | PLS, SNV, MC, rank 2 | 0.8118 | | Not analyzed | |
| Particle size distribution D10 size | Coulter laser diffraction | 11A | logD10 PLS, SNV, MC, rank 1 | 0.9129 | 11B | logD10 PLS, SNV, MC, rank 1 | 0.9838 |
| Particle size distribution D50 size | Coulter laser diffraction | 12A | logD50 PLS, SNV, MC, rank 3 | 0.9667 | 12B | logD50 PLS, SNV, MC, rank 5 | 0.9416 |

TABLE 2-continued

| Property | Physiochemical Method | Stationary Sample | | | Simulated Moving Samples | | |
|---|---|---|---|---|---|---|---|
| | | Fig. | Regression Model | $R^2$ | Fig. | Regression Model | $R^2$ |
| Particle size distribution D90 size | Coulter laser diffraction | 13A | logD90 PLS, $1^{st}$ der, MC, rank 1 | 0.7246 | 13B | logD90 PLS, $1^{st}$ der, MC, rank 1 | 0.5977 |
| Cation exchange content (CEC) | Cu-trien complex exchange | 14A | For samples CEC > 5: PLS, $1^{st}$ der, MC, rank 1; for samples predicted to be CEC < 5, same model except excluded calibration samples with CEC > 5 | 0.9388 | 14B | PCR, area norm, $1^{st}$ der, MC, rank 2 | 0.9543 |
| Methylene blue index (MBI) | MBI titration | 15A | PLS, $1^{st}$ der, MC, rank 1 | 0.8849 | 15B | PLS, $1^{st}$ der, MC, rank 1 | 0.949 |
| Total clay content (wt. %) | X-ray diffraction (XRD) | 16A | PLS, area norm, rank 3 | 0.8998 | 16B | PCR, $1^{st}$ der, MC, rank 1 | 0.886 |
| Quartz content (wt. %) | X-ray diffraction (XRD) | 17 | PLS, MC, rank 10 | 0.9756 | | Not analyzed | |
| Kaolinite content (wt. %) | X-ray diffraction (XRD) | 18A | PLS, area norm, rank 9 | 0.945 | 18B | PCR, area norm, rank 2 | 0.7226 |
| Illite content (wt. %) | X-ray diffraction (XRD) | 19A | SVM nu linear, scaling | 0.8877 | 19B | PCR, area norm, rank 2 | 0.9283 |
| Amorphous material content (wt. %) | X-ray diffraction (XRD) | 20 | SVM nu linear | 0.8018 | | Not analyzed | |
| Total ash content (wt. %) | Loss-on-ignition (LOI) | 21A | 100-% Ash, PLS, area norm, rank 4 | 0.9739 | 21B | 100-% Ash, PLS, area norm, rank 3 | 0.9293 |
| Connate water conductivity (mS/cm) | Extraction & electrical resistance | 22 | PLS, SNV, MC, rank 3 | 0.8084 | | Not analyzed | |
| Connate water chloride content (mg/kg) | Extraction & ion chromatography | 23 | PLS, SNV, MC, rank 3 | 0.8676 | | Not analyzed | |
| Connate water alkalinity (mg/kg $CaCO_3$ equivalent) | Extraction & titration | 24 | SVM nu linear, scaling | 0.6051 | | Not analyzed | |

Having regard to the $R^2$ values in Table 2, the following observations are made. The LIBS-based method of the present invention generally provides good to very good correlation with physicochemical analysis methods for determination of bitumen content, water content, particle size information, MBI, CEC, mineralogical content, and total ash content. Correlation is less strong for connate water properties (e.g., conductivity, chloride content, alkalinity), but sufficiently good for fast screening and determining whether samples are above or below a certain threshold. In general, the correlation is better for stationary samples than for simulated moving samples, in part due to the minimum depth of ablation being satisfied for stationary samples.

Figure 25:
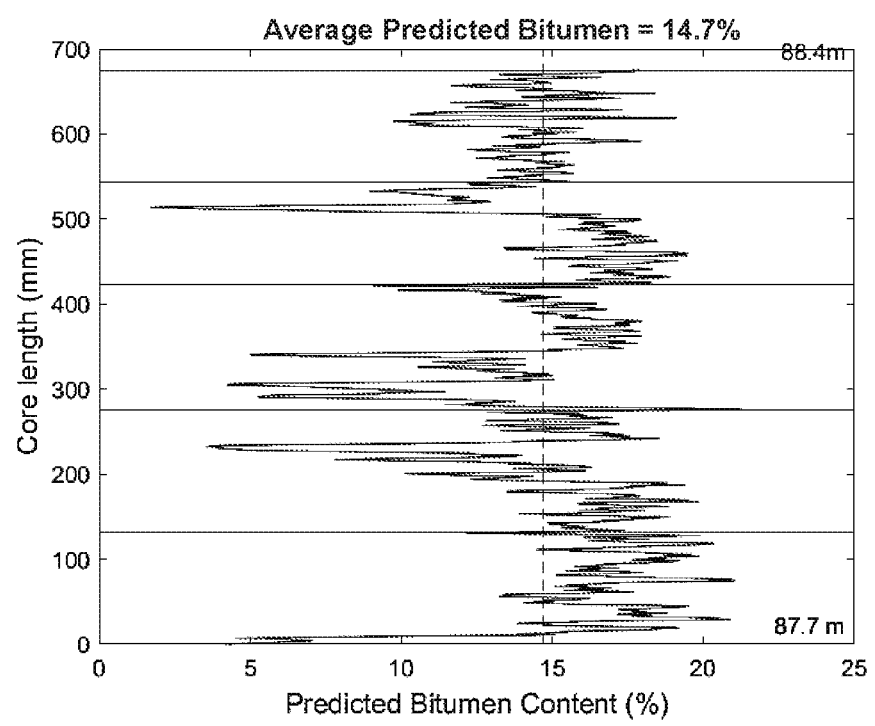
FIG. 25 is a chart of the bitumen content as a function of core length as determined by a LIBS-based method of the present invention for an oil sand core sample.

FIG. 25 shows a chart of the bitumen content as a function of core length as determined by a LIBS-based method of the present invention for an oil sand core sample. The continuous LIBS scan across the core length allows thin features (e.g. clay lenses with lower bitumen content) to be included. Having a suite of LIBS-predicted parameters as a function of core depth facilitates the selection of ranges of core depth to be averaged together for the purposes of producing mine block models. In FIG. 25, the averaged bitumen content over the core depth range of 87.7 m to 88.4 m was determined to be 14.7%.

Interpretation.

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The claimed invention is:

1. A method of determining at least one property of interest of a test oil sands ore sample that is not an aqueous oil sands slurry, the method comprising the steps of:
   (a) applying a plurality of pulsed laser shots focused on a surface of the test oil sands ore sample to ablate the test oil sands ore sample and create a plurality of short-lived plasmas;
   (b) acquiring the emission spectra from at least some or all of the plasmas;
   (c) repeating steps (a) and (b) on one or more ablation sites;
   (d) averaging the acquired emission spectra together for the test oil sands ore sample to form a test emission spectrum; and
   (e) determining the at least one property of interest comprising one or more of the following properties:
      (i) a cation exchange capacity;
      (ii) an ash content;
      (iii) an amorphous material content;
      (iv) at least one connate water property; or
      (v) a solids particle size distribution property comprising one or more of a solids percentile particle size, or a percentage of solid particles having a particle size less than or greater than 180 µm,
   by applying, to the test emission spectrum, at least one calibration loading obtained from a chemometric model relating an emission spectrum, or a portion of an emission spectrum, obtained from a known oil sands ore sample to a reference value obtained from a physicochemical analysis method for determining the at least one property of interest of the known oil sands ore sample; and
   wherein step (a) is repeated while the test oil sands ore sample is moved in a forward longitudinal direction in relation to the pulsed laser shots, such that the plurality of ablation sites collectively form a continuous ablated groove along the surface of the test oil sands ore sample; and
   either:
      wherein step (a) is repeated while scanning the pulsed laser shots back and forth, in the forward longitudinal direction and a rearward longitudinal direction opposite thereto, over a scan line distance, such that successive ones of the ablation sites gradually deepen a portion of the ablated groove over the scan line distance; or wherein step (a) is repeated with the pulsed laser shots oriented relative to the normal to the surface of the test oil sands ore sample at an angle, $\alpha$, of at least 5° and less than or equal to 45°, and fired in the longitudinal direction opposite to the longitudinal direction of movement of the test oil sands ore sample in relation to the pulsed laser shots.

2. The method of claim 1, wherein the at least one property of interest comprises the cation exchange capacity.

3. The method of claim 1, wherein the at least one property of interest comprises the ash content.

4. The method of claim 1, wherein the at least one property of interest comprises the amorphous material content.

5. The method of claim 1, wherein the at least one property of interest comprises the at least one connate water property.

6. The method of claim 5, wherein the at least one connate water property comprises a connate water conductivity.

7. The method of claim 5, wherein the at least one connate water property comprises a connate water chloride content.

8. The method of claim 5, wherein the at least one connate water property comprises a connate water alkalinity.

9. The method of claim 1, wherein the at least one property of interest comprises the solids particle size distribution property comprising the solids percentile particle size.

10. The method of claim 1, wherein the at least one property of interest comprises the percentage of solid particles have a particle size less than or greater than 180 μm.

11. The method of claim 1, wherein step (a) is repeated while the test oil sands ore sample is either not moving in relation to the pulsed laser shots, or moving in relation to the pulsed laser shots solely for allowing successive pulsed laser shots to be incident on different portions of the test oil sands ore sample.

12. The method of claim 11, wherein the test oil sands ore sample is moving in relation to the pulsed laser shots at a speed equal to or less than 50 mm/s.

13. The method of claim 1, wherein step (a) is repeated while the test oil sands ore sample is moving in relation to the pulsed laser shots for conveying the test oils sands ore sample between stages of a bitumen extraction process.

14. The method of claim 13, wherein the test oil sands ore sample is moving in relation to the pulsed laser shots at a speed equal to or greater than 50 mm/s.

15. The method of claim 1, wherein successive ones of the ablation sites overlap with each other.

16. The method of claim 1, wherein step (a) is repeated while scanning the pulsed laser shots back and forth, in the forward longitudinal direction and the rearward longitudinal direction opposite thereto, over the scan line distance, such that successive ones of the ablation sites gradually deepen the portion of the ablated groove over the scan line distance.

17. The method of claim 16, wherein the scan line distance is less than about 1 cm in length in the longitudinal direction.

18. The method of claim 1, wherein step (a) is repeated with the pulsed laser shots oriented relative to the normal to the surface of the test oil sands ore sample at the angle, $\alpha$, of at least 5° and less than or equal to 45°, and fired in the longitudinal direction opposite to the longitudinal direction of movement of the test oil sands ore sample in relation to the pulsed laser shots.

19. The use of a laser induced breakdown plasma spectroscopic system comprising a laser ablator and a spectrometer combined with one or more processors and a memory, wherein the memory stores comprises a non-transient computer readable medium storing instructions executable by the one or more processors to implement the method of claim 1.

20. A method of determining at least one property of interest of a test oil sands ore sample that is not an aqueous oil sands slurry, the method comprising the steps of:

(a) applying a plurality of pulsed laser shots focused on a surface of the test oil sands ore sample to ablate the test oil sands ore sample and create a plurality of short-lived plasmas;

(b) acquiring the emission spectra from at least some or all of the plasmas;

(c) repeating steps (a) and (b) on one or more ablation sites;

(d) averaging the acquired emission spectra together for the test oil sands ore sample to form a test emission spectrum; and (e) determining the at least one property of interest by applying, to the test emission spectrum, at least one calibration loading obtained from a chemometric model relating an emission spectrum, or a portion of an emission spectrum, obtained from a known oil sands ore sample to a reference value obtained from a physicochemical analysis method for determining the at least one property of interest of the known oil sands ore sample; and wherein step (a) is repeated while the test oil sands ore sample is moved in a forward longitudinal direction in relation to the pulsed laser shots, such that the plurality of ablation sites collectively form a continuous ablated groove along the surface of the test oil sands ore sample; and wherein step (a) is repeated while scanning the pulsed laser shots back and forth, in the forward longitudinal direction and a rearward longitudinal direction opposite thereto, over a scan line distance, such that successive ones of the ablation sites gradually deepen a portion of the ablated groove over the scan line distance.

21. The method of claim 20, wherein the scan line distance is less than about 1 cm in length in the longitudinal direction.

22. A method of determining at least one property of interest of a test oil sands ore sample that is not an aqueous oil sands slurry, the method comprising the steps of:

(a) applying a plurality of pulsed laser shots focused on a surface of the test oil sands ore sample to ablate the test oil sands ore sample and create a plurality of short-lived plasmas;

(b) acquiring the emission spectra from at least some or all of the plasmas;

(c) repeating steps (a) and (b) on one or more ablation sites;

(d) averaging the acquired emission spectra together for the test oil sands ore sample to form a test emission spectrum; and (e) determining the at least one property of interest by applying, to the test emission spectrum, at least one calibration loading obtained from a chemometric model relating an emission spectrum, or a portion of an emission spectrum, obtained from a known oil sands ore sample to a reference value obtained from a physicochemical analysis method for determining the at least one property of interest of the known oil sands ore sample; and wherein step (a) is repeated while the test oil sands ore sample is moved in a forward longitudinal direction in relation to the pulsed laser shots, such that the plurality of ablation sites collectively form a continuous ablated groove along the surface of the test oil sands ore sample; and wherein step (a) is repeated with the pulsed laser shots oriented relative to the normal to the surface of the test oil sands ore sample at an angle, $\alpha$, of at least 5° and less than or equal to 45°, and fired in the longitudinal direction opposite to the longitudinal direction of movement of the test oil sands ore sample in relation to the pulsed laser shots.

* * * * *

UNITED STATES PATENT AND TRADEMARK OFFICE
CERTIFICATE OF CORRECTION

PATENT NO. : 11,333,555 B2  
APPLICATION NO. : 16/920029  
DATED : May 17, 2022  
INVENTOR(S) : Aïssa Harhira et al.

Page 1 of 1

It is certified that error appears in the above-identified patent and that said Letters Patent is hereby corrected as shown below:

On the Title Page

Item (73), should read as follows:  
SYNCRUDE CANADA LTD. in trust for the owners of the Syncrude Project as such owners exist now and in the future, Calgary (CA); and  
NATIONAL RESEARCH COUNCIL OF CANADA, Ottawa (CA)

Signed and Sealed this  
Fourth Day of July, 2023

Katherine Kelly Vidal  
*Director of the United States Patent and Trademark Office*